(12) United States Patent
Miyasaka et al.

(10) Patent No.: US 8,223,162 B2
(45) Date of Patent: Jul. 17, 2012

(54) IMAGE PROCESSING APPARATUS, IMAGE PROCESSING METHOD, PROGRAM THEREOF, DISPLAY DEVICE, AND IMAGE DISPLAY SYSTEM

(75) Inventors: Daigo Miyasaka, Tokyo (JP); Masao Imai, Tokyo (JP); Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 826 days.

(21) Appl. No.: 12/310,159

(22) PCT Filed: Jul. 25, 2007

(86) PCT No.: PCT/JP2007/064610
§ 371 (c)(1),
(2), (4) Date: Feb. 13, 2009

(87) PCT Pub. No.: WO2008/026403
PCT Pub. Date: Mar. 6, 2008

(65) Prior Publication Data
US 2009/0244086 A1 Oct. 1, 2009

(30) Foreign Application Priority Data
Aug. 30, 2006 (JP) ................................. 2006-234474

(51) Int. Cl.
G09G 5/00 (2006.01)
G09G 5/02 (2006.01)
G09G 3/20 (2006.01)
G06T 1/00 (2006.01)
H04N 5/46 (2006.01)
H04N 5/38 (2006.01)
G06K 9/40 (2006.01)

(52) U.S. Cl. ........ 345/581; 345/624; 345/547; 345/204; 345/690; 348/489; 348/563; 348/571; 348/715; 358/3.01; 358/3.18; 358/523; 358/448; 359/237; 359/264; 382/181; 382/254; 382/274; 382/305

(58) Field of Classification Search .................. 345/581, 345/589, 606, 617, 624, 547–549, 555, 204, 345/690–691, 20, 27, 63, 77, 84, 89; 348/54–56, 348/367, 489–490, 553, 563, 571, 671, 715, 348/723, 724, 739; 359/237, 264, 325, 615; 358/3.01, 1.9
See application file for complete search history.

(56) References Cited

U.S. PATENT DOCUMENTS
6,529,209 B1  3/2003 Dunn et al.
(Continued)

FOREIGN PATENT DOCUMENTS
JP  63-312788  12/1988
JP  06-186506  7/1994
(Continued)

*Primary Examiner* — Wesner Sajous
(74) *Attorney, Agent, or Firm* — Foley & Lardner LLP

(57) ABSTRACT

An image processing apparatus, an image processing method, and a program thereof, and a display device are provided, in which reproduction of a secret image from one dispersed image is difficult. A secret image and a reverse image included in at least two types of images are in a relationship of forming image data of an image not correlated with the secret image when luminance values of image data respectively are added pixel by pixel. Included are: a memory 101 that stores the inputted image data; a dispersed image creating/data allocating circuit 102 that creates image data of a plurality of dispersed images in which the secret image is formed when luminance values are added pixel by pixel based on the image data of the secret image and grayscales different from grayscale values of the secret image are allocated to the pixels respectively; and a shutter spectacle control signal creating circuit 103 that outputs a shutter control signal for setting a light shutter to a light transmission state only in a time for outputting image signals in accordance with the image data of the dispersed images.

66 Claims, 24 Drawing Sheets

U.S. PATENT DOCUMENTS

| | | | |
|---|---|---|---|
| 7,283,105 B2 * | 10/2007 | Dallas et al. | 345/32 |
| 7,439,940 B1 * | 10/2008 | Maguire, Jr. | 345/7 |
| 2009/0262127 A1 * | 10/2009 | Miyasaka et al. | 345/589 |
| 2011/0227887 A1 * | 9/2011 | Dallas et al. | 345/205 |
| 2011/0267362 A1 * | 11/2011 | Handschy et al. | 345/589 |

FOREIGN PATENT DOCUMENTS

| | | |
|---|---|---|
| JP | 07-219489 | 8/1995 |
| JP | 2001-016429 A | 1/2001 |
| JP | 2001-255844 A | 9/2001 |
| JP | 2002-072994 A | 3/2002 |

* cited by examiner

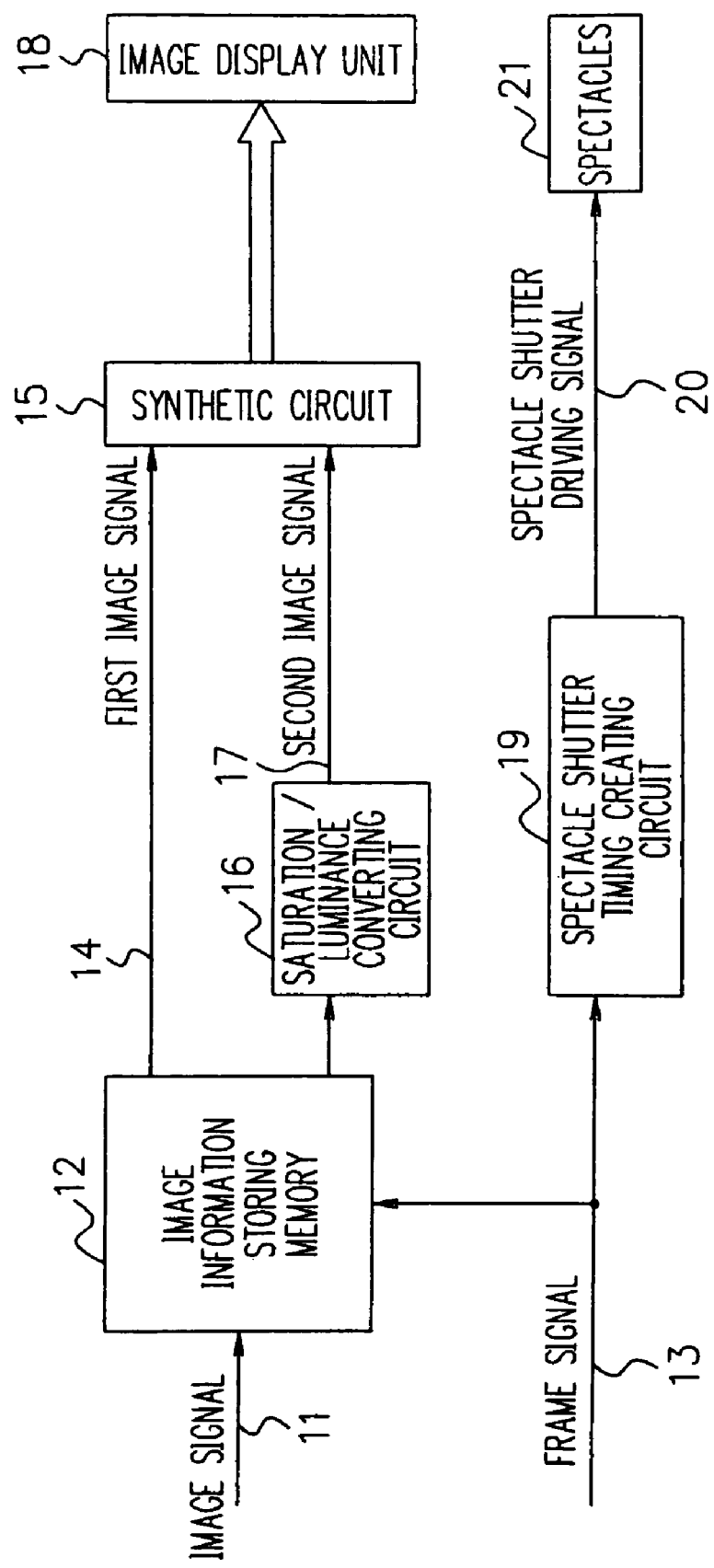
F I G. 1

| 31 | 35 | 38 | 42 | 32 | 36 | 39 |
|---|---|---|---|---|---|---|
| 21 | 25 | 28 | 32 | 22 | 26 | 29 |
| 25 | 28 | 32 | 36 | 26 | 29 | 33 |
| 28 | 32 | 36 | 38 | 28 | 33 | 37 |
| 31 | 35 | 38 | 42 | 32 | 36 | 39 |

| 21 | 25 | 28 | 32 | 22 | 26 | 29 |
|---|---|---|---|---|---|---|
| 31 | 35 | 38 | 42 | 32 | 36 | 39 |
| 28 | 32 | 36 | 38 | 28 | 33 | 37 |
| 25 | 28 | 32 | 36 | 26 | 29 | 33 |
| 21 | 25 | 28 | 32 | 22 | 26 | 29 |

| 31 | 28 | 25 | 22 | 32 | 29 | 26 |
|---|---|---|---|---|---|---|
| 41 | 38 | 36 | 32 | 43 | 39 | 37 |
| 38 | 35 | 32 | 28 | 39 | 36 | 33 |
| 35 | 32 | 28 | 26 | 36 | 33 | 29 |
| 31 | 28 | 25 | 22 | 32 | 29 | 26 |

| 41 | 38 | 36 | 32 | 43 | 39 | 37 |
|---|---|---|---|---|---|---|
| 31 | 28 | 25 | 22 | 32 | 29 | 26 |
| 35 | 32 | 28 | 26 | 36 | 33 | 29 |
| 38 | 35 | 32 | 28 | 39 | 36 | 33 |
| 41 | 38 | 36 | 32 | 43 | 39 | 37 |

DISPERSED IMAGES

| 125 | 125 | 126 | 127 | 128 | 129 | 130 | 131 |
|---|---|---|---|---|---|---|---|
| 125 | 126 | 127 | 128 | 129 | 130 | 131 | 131 |
| 126 | 127 | 128 | 129 | 130 | 131 | | |
| 127 | 128 | 129 | 130 | 131 | | | |

SECRET IMAGE

FIG. 5(a)

DISPERSED IMAGE CREATING MATRICES

FIG. 5(b)

DISPERSED IMAGE CREATING MATRICES

FIG. 6(a)

| A + B = S (SECRET IMAGE) | A + (−A) = G (GRAY) |

| SECRET IMAGE | REVERSE IMAGE OF SECRET IMAGE | SECRET IMAGE | REVERSE IMAGE OF SECRET IMAGE | PUBLIC IMAGE |
|---|---|---|---|---|
| A | −A | B | −B | C |

WITHOUT SHUTTER SPECTACLES : A + (−A) + B + (−B) + C = C + 2G
WITH SHUTTER SPECTACLES : A + B = S

FIG. 6(b)

| SECRET IMAGE | REVERSE IMAGE OF SECRET IMAGE | SECRET IMAGE | REVERSE IMAGE OF SECRET IMAGE | PUBLIC IMAGE |
|---|---|---|---|---|
| A | −A | 2B | −2B | C |

WITHOUT SHUTTER SPECTACLES : A + (−A) + 2B + (−2B) + C = C + 3G
WITH SHUTTER SPECTACLES (WITHOUT MODULATION) : A + 2B ≠ S
WITH SHUTTER SPECTACLES (WITH MODULATION) : A + 0.5 × 2B = S

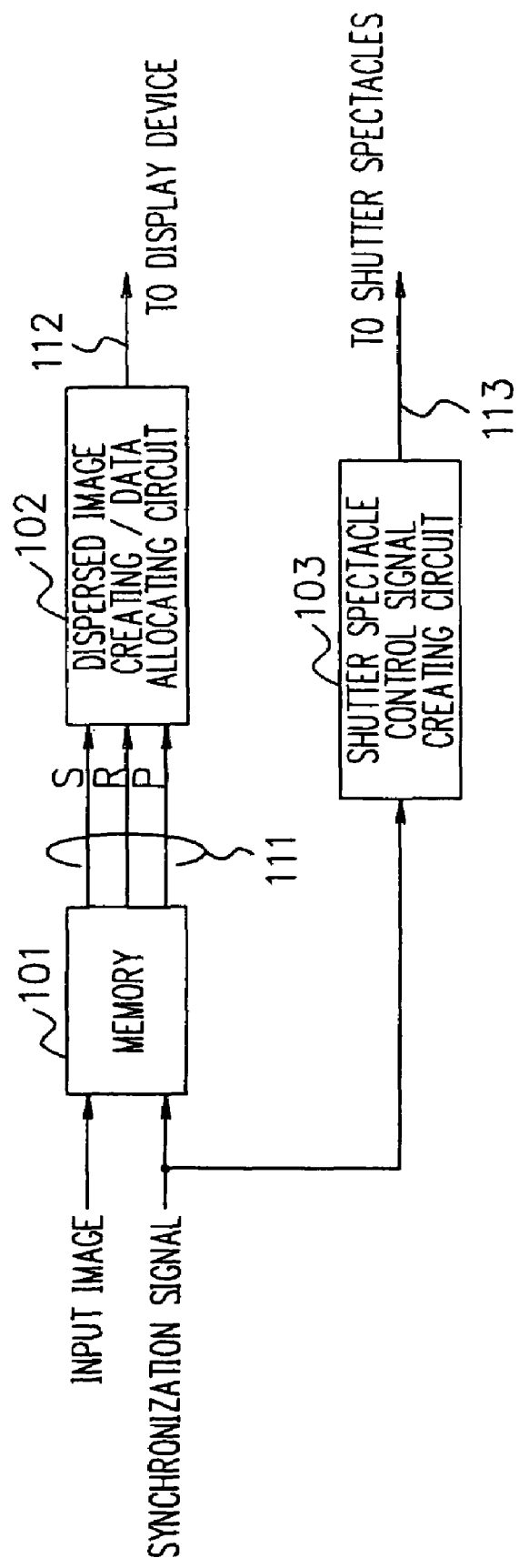

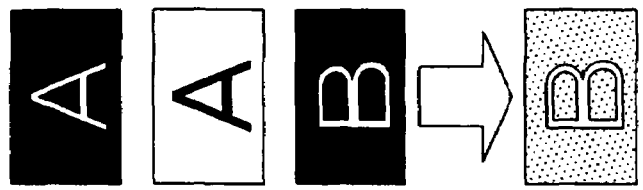
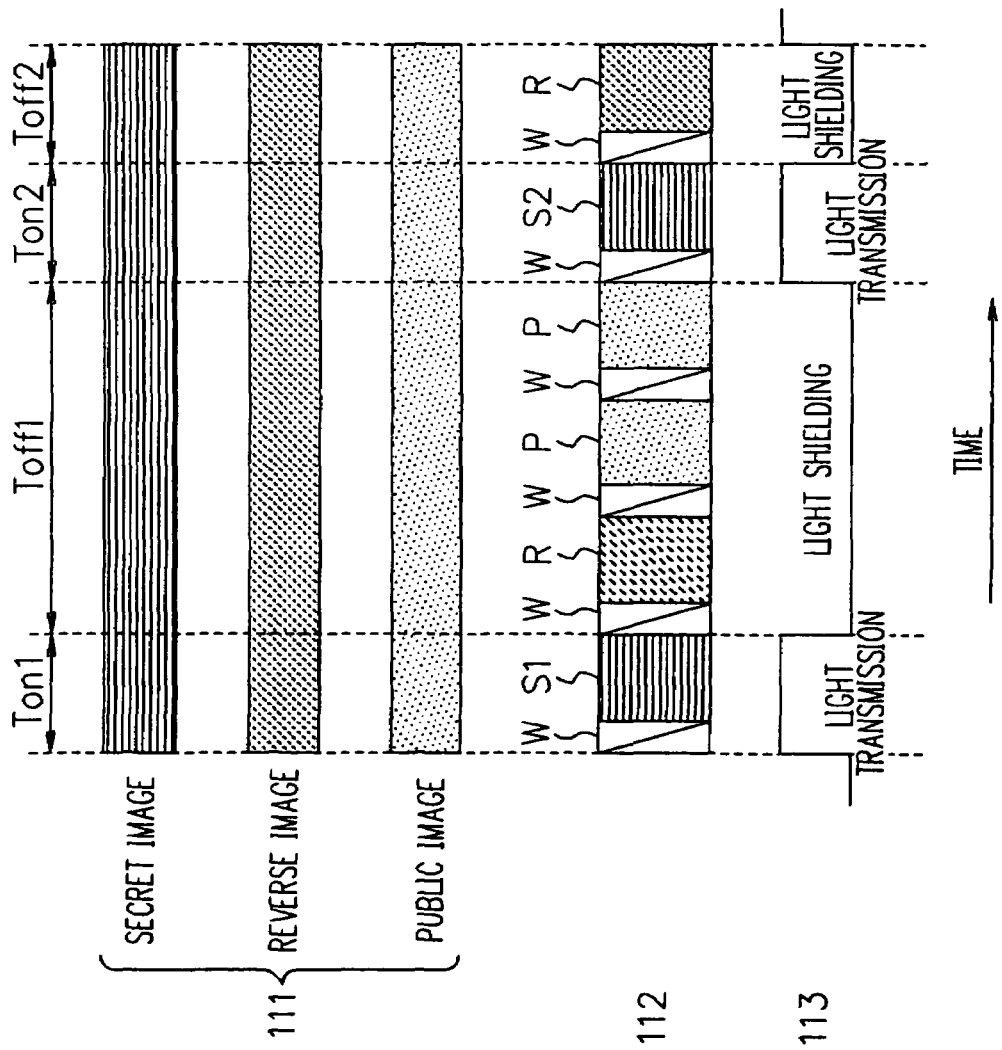
FIG. 9

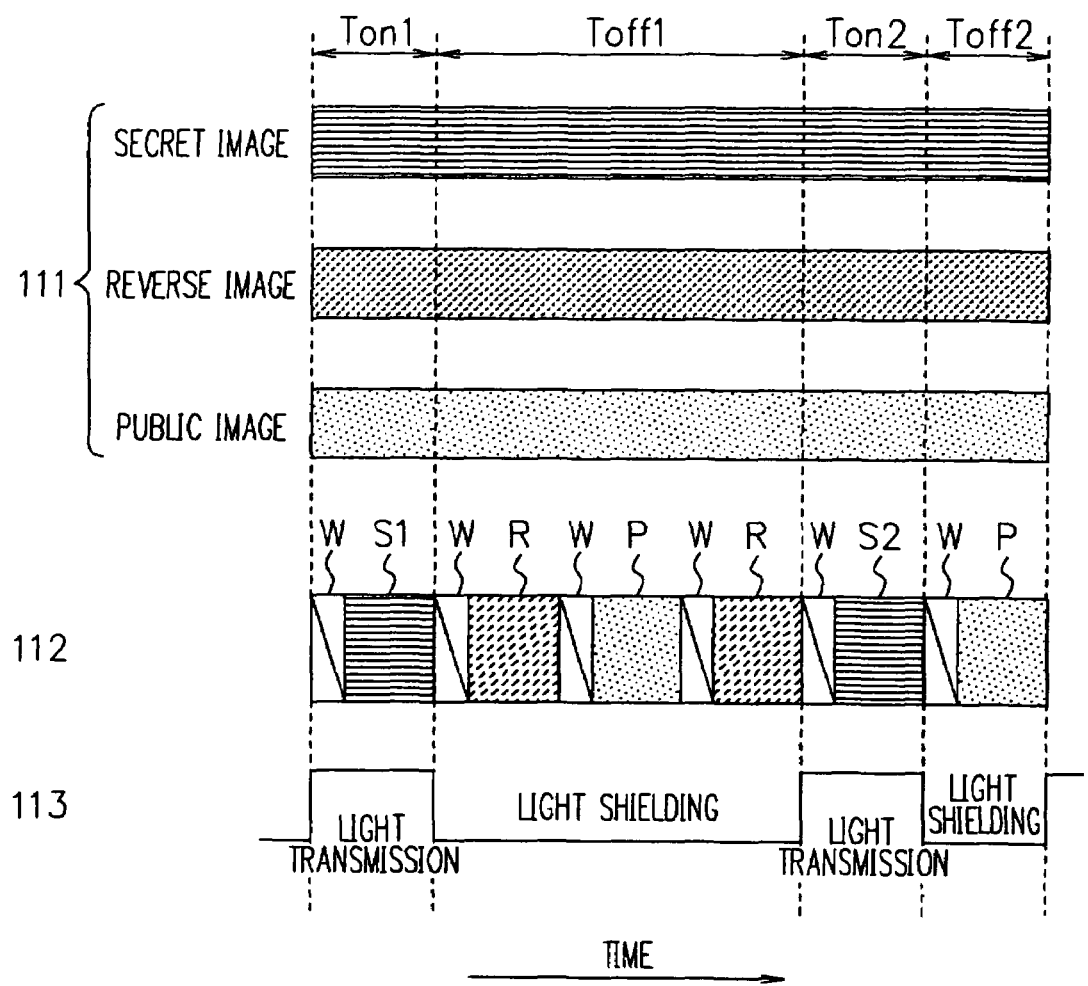
F I G. 10

IMAGE PROCESSING APPARATUS, IMAGE PROCESSING METHOD, PROGRAM THEREOF, DISPLAY DEVICE, AND IMAGE DISPLAY SYSTEM

TECHNICAL FIELD

The present invention relates to an image processing apparatus, an image processing method, a program thereof, a display device, and an image display system, and more particularly, to an apparatus, a method, and a program thereof that can present the content to a specific user/authenticated person.

BACKGROUND ART

A flat panel display such as a liquid crystal display and a plasma display is widely applied to from a mobile device such as a cellular phone terminal to a large device such as a public display set up on the street. Much of the development of such a display emphasizes on wide viewing angle, high brightness, and high image quality, and a clean and clear display from any angle has been requested.

Meanwhile, there is content such as secret information and private data displayed on the display that one does not want someone else to see. Therefore, in today's progressing ubiquitous society accompanied by the development of information devices, it is also an important problem to prevent other people from seeing the display content in public where unspecified people exist.

Furthermore, secret information is sometimes handled in office, information that one does not want a person who passes behind the seat to see.

In some of the cellular phone terminals and the like, an optical shield plate (louver) is installed, and a display is provided in which the display content can be visually checked only from a specific direction. However, since the display content can be peeped from right behind the user, the display is not satisfactory in terms of confidentiality.

An example of a related art for solving the problems includes "Image Display Device" disclosed in Patent Document 1. In the image display device, the user wears spectacles with image selecting function, and only the person wearing the spectacles (user) can visually check a specific image (hereinafter, "secret image"), while another image (hereinafter, "public image") is presented to other people.

Specifically, an image forming device shown in FIG. 1 stores an input image signal 11 of one frame to an image information storing memory 12 based on a frame signal 13. The image forming device then reads out image information from the memory 12 at a speed twice as fast as the frame cycle (i.e., reads out twice during one frame time), compresses in half the signal read out first, inputs the signal to a synthetic circuit 15 as a first image signal 14, converts the saturation and the luminance of an image signal read out next, and inputs the signal to the synthetic circuit 15 as a second image signal 17. Therefore, the image display unit 18 alternately displays the first image signal 14 and the second image signal 17.

Meanwhile, the frame signal 13 is also inputted to a spectacle shutter timing creating circuit 19. The spectacle shutter timing creating circuit 19 drives a shutter of spectacles 21 and controls the spectacle shutter so that the user cannot see an image based on the second image signal 17.

According to the configuration and the operation, a person not wearing the spectacles 21 can see a gray image or a third image (public image) that is a synthetic image of the first image signal 14 and the second image signal 17 and that is not related to the first image signal 14, and a person wearing the spectacles 21 can see a desired image (secret image) based on the first image signal 14.

Another example of a related art for solving the problems includes "Method for Providing Data That Can Be Seen Privately on Display That the Public Can See" disclosed in Patent Document 2. The method disclosed in Patent Document 2 allows only an authorized user to decipher a private image (secret image) on the display and allows an unauthorized user to see only a public image such as a random pattern, an image difficult to decipher, or a screen saver image.

To promote the object, the invention disclosed in Patent Document 2 synchronizes an image processing technique including a data hiding pattern and an alternating pattern with a display incorporated with an image created by an image processing technology (for example, combined with a wearable device such as active glasses). Finally, ability for providing data that can be seen privately on display that the public can see is completed by a "known ability for integrating dissimilar images into a single image" of the visual system of human beings.

Another example of a related art for solving the problems includes a "Secret Mechanism" disclosed in Patent Document 3. To prevent a third party from identifying the display content of a display device of a word processor, a computer, or the like, the secret mechanism disclosed in Patent Document 3 displays a display pattern such as characters or graphics on a pattern display unit of the display device and displays an incomprehensible disturbance pattern (characters or graphics for preventing a third party from identifying characters or graphics displayed as a display pattern). A switching signal outputting unit creates a switching signal synchronized with the display timing of the display pattern and the disturbance pattern and provides the signal to spectacles. The spectacles open and close the shutter in accordance with the switching signal, and only the user of the display device can see the display pattern. A nonuser sees the display pattern and the disturbance pattern switched at high speed at the same time and cannot identify the display content due to the afterimage effect of the display screen.

The secret mechanism disclosed in Patent Document 3 also divides the display pattern (secret image) into a plurality of patterns to create a divided display pattern and further divides the disturbance pattern (public image) into a plurality of patterns to create a divided disturbance pattern to thereby make it more difficult for a nonuser to recognize the display pattern.

Furthermore, examples of a related art for creating a plurality of transformed images from one image that are different from the original image include "Contaminant Content Distribution System, Contaminant Content Distribution Apparatus, Contaminant Content Utilizing Apparatus, Contaminant Content Distribution Method, and Contaminant Content Utilization Method" disclosed in Patent Document 4 and "Image Processing Method, Apparatus, and Recording Medium Recording Image Processing Program" disclosed in Patent Document 5.

Patent Document 1: Japanese Patent Laid Open Publication No. 63-312788

Patent Document 2: Japanese Patent Laid Open Publication No. 2001-255844

Patent Document 3: Japanese Patent Laid Open Publication No. 6-186503

Patent Document 4: Japanese Patent Laid Open Publication No. 2001-16429

Patent Document 5: Japanese Patent Laid Open Publication No. 2002-72994

DISCLOSURE OF INVENTION

Problem to be Solved by the Invention

However, there is a problem in the invention disclosed in Patent Document 1 that a person not wearing the spectacles can also perceive the secret image since the image synthesis on the retina is not complete by intentionally blinking during observation. There is also a problem that the secret image is photographed with a camera with short shutter time since the image synthesis is not performed either.

To solve the problems, in Patent Document 2 and Patent Document 3, the secret image is spatially divided area by area or pixel by pixel to disperse the secret image into a plurality of images, thereby making the dispersed secret images alone meaningless. As a result, the dispersed secret images, especially images having a meaning in the shape such as characters, cannot be perceived even with intentional blinking or photographing with camera.

The methods of Patent Document 2 and Patent Document 3 are simple dispersion methods of the secret image because only whether to display the secret image pixel by pixel or area by area is selected. However, in the methods, it is difficult to prevent perceiving the secret image from the dispersed images if the gradation change between adjacent pixels in the image is relatively small, such as in a natural image. Even in the case of characters, it is difficult to prevent perceiving the secret image from the dispersed images depending on the shape and gradation.

An example of a gradation matrix of pixel "23, 24, 25, 26, 27" will be considered. If dispersed images are formed with 24 and 26 as a set and 23, 25, and 27 as a set, and if black is set to "0" grayscale value, the dispersed images denote "0, 24, 0, 26, 0" and "23, 0, 25, 0, 27" respectively. However, the secret image can be estimated by interpolation even if black displays are inserted in the images.

In the inventions disclosed in Patent Document 2 and Patent Document 3, when continuous shooting is performed with a camera with short shutter time, the secret image can be reproduced by arbitrarily combining the photographed pictures.

An object of the inventions disclosed in Patent Document 4 and Patent Document 5 is to make the duplication of image data to be displayed difficult, and the object is attained as long as the transformed images are not the same as the original image data. Therefore, since it is not taken into consideration at all to make the estimation of the original image from the transformed images difficult, the inventions cannot be applied to the display of the secret image.

The present invention has been made in view of the foregoing problems, and an object of the present invention is to provide an image processing apparatus, an image processing method, a program thereof, a display device, and an image display system regardless of the type of image, in which a secret image does not easily become apparent even by intentional blinking or by use of camera, and in which it is difficult to reproduce the secret image from dispersed images even if continuous shooting is performed with a camera with short shutter time.

Means for Solving the Problems

To attain the object, a first aspect of the present invention provides an image processing apparatus in which reproduction of a secret image from one dispersed image is difficult.

The first aspect of the present invention is an image processing apparatus shown in any of the following 1-1 to 1-3.

1-1: An image processing apparatus that sequentially outputs image signals in accordance with each of at least two types of images, the image processing apparatus including: a memory that stores the image data of the inputted at least two types of images, a first image and a second image included in the at least two types of images being in a relationship of forming image data of an image not correlated with the first image when luminance values of image data respectively are added pixel by pixel; means for creating image data of a plurality of first dispersed images in which the first image is formed when luminance values are added pixel by pixel based on the image data of the first image and grayscale values different from grayscale values of the first image are allocated to the pixels respectively; and shutter controlling means for outputting a shutter control signal for setting a light shutter to a light transmission state only in a time for outputting image signals in accordance with the image data of the first dispersed images.

1-2: An image processing apparatus that sequentially outputs image signals in accordance with each of at least two types of images, the image processing apparatus including: a memory that stores the image data of the inputted at least two types of images; means for creating image data of a second image that forms image data of an image not correlated with a first image when the luminance values are added pixel by pixel based on the image data of the first image included in the at least two types of images stored in the memory; means for creating image data of a plurality of first dispersed images in which the first image is formed when luminance values are added pixel by pixel based on the image data of the first image and grayscale values different from grayscale values of the first image are allocated to the pixels respectively; and shutter controlling means for outputting a shutter control signal for setting a light shutter to a light transmission state only in a time for outputting image signals in accordance with the image data of the first dispersed images.

1-3: An image processing apparatus that sequentially outputs image signals in accordance with each of at least two types of images, the image processing apparatus including: a memory that stores the image data of the inputted at least two types of images, a first image and a second image included in the at least two types of images being in a relationship of forming image data of an image not correlated with the first image when luminance values of image data respectively are added pixel by pixel; means for creating image data of a plurality of first dispersed images in which the first image is formed when luminance values are added pixel by pixel based on the image data of the first image and grayscale values different from grayscale values of the first image are allocated to the pixels respectively; modulating means for multiplying the luminance values by a degree of modulation pixel by pixel, the degree of modulation being one or greater, in the image data of the plurality of first dispersed images; and shutter controlling means for setting a transmittance of a light shutter to a value in which a maximum transmittance is multiplied by an inverse of the degree of modulation in a time for outputting image signals in accordance with the modulated image data of the first dispersed images and for outputting a shutter control signal to set a light shielding state in a time for outputting image signals in accordance with image data of the images other than the first dispersed images.

In the first aspect of the present invention, it is preferable that the first dispersed images include many high spatial frequency components if created based on areas with many high spatial frequency components in the first image and include many low spatial frequency components if created based on areas with many low spatial frequency components in the first image. Furthermore, it is preferable that means for creating image data of a plurality of second dispersed images that form the second image when luminance values are added pixel by pixel based on the image data of the second image; allocating luminance values to arbitrary pixels of the plurality of second dispersed images such that grayscale values of two or more second dispersed images are not grayscale values expressing black; and outputting image signals in accordance with image data of the second dispersed images instead of the image signals in accordance with the image data of the second image are included. In addition, it is more preferable that outputting an image signal of an image other than the second dispersed images between an image signal in accordance with any of the image data of the second dispersed images and an image signal in accordance with any other image data of the second dispersed image signal is included.

In any of the configurations of the first aspect of the present invention, it is preferable that outputting an image signal in accordance with image data of a third image while outputting the shutter control signal for setting the light shutter to the light shielding state is included. Furthermore, it is preferable that outputting an image signal of an image other than the first dispersed images between an image signal in accordance with any of the image data of the first dispersed images and an image signal in accordance with any other image data of the first dispersed image signal is included.

To attain the object, a second aspect of the present invention provides an image processing method in which reproduction of a secret image from one dispersed image is difficult.

The second aspect of the present invention is an image processing method shown in any of the following 2-1 to 2-3.

2-1: An image processing method for sequentially outputting image signals in accordance with each of at least two types of images, wherein a first image and a second image included in the at least two types of images being in a relationship of forming image data of an image not correlated with the first image when luminance values of image data respectively are added pixel by pixel, the image processing method including: creating image data of a plurality of first dispersed images in which the first image is formed when luminance values are added pixel by pixel based on the image data of the inputted first image and grayscale values different from grayscale values of the first image are allocated to the pixels respectively; and outputting a shutter control signal for setting a light shutter to a light transmission state only in a time for outputting image signals in accordance with the image data of the first dispersed images.

2-2: An image processing method for sequentially outputting image signals in accordance with each of at least two types of images, the image processing method including: storing the image data of the inputted at least two types of images in a memory; creating image data of a second image that forms image data of an image not correlated with a first image when the luminance values are added pixel by pixel based on the image data of the first image included in the at least two types of images stored in the memory; creating image data of a plurality of first dispersed images in which the first image is formed when luminance values are added pixel by pixel based on the image data of the first image and grayscale values different from grayscale values of the first image are allocated to the pixels respectively; and outputting a shutter control signal for setting a light shutter to a light transmission state only in a time for outputting image signals in accordance with the image data of the first dispersed images.

2-3: An image processing method for sequentially outputting image signals in accordance with each of at least two types of images, the image processing method including: storing the image data of the inputted at least two types of images in a memory, a first image and a second image included in the at least two types of images being in a relationship of forming image data of an image not correlated with the first image when luminance values of image data respectively are added pixel by pixel; creating image data of a plurality of first dispersed images in which the first image is formed when luminance values are added pixel by pixel based on the image data of the first image and grayscale values different from grayscale values of the first image are allocated to the pixels respectively; multiplying the luminance values by a degree of modulation pixel by pixel, the degree of modulation being one or greater, in the image data of the plurality of first dispersed images; and setting a transmittance of a light shutter to a value in which a maximum transmittance is multiplied by an inverse of the degree of modulation in a time for outputting image signals in accordance with the modulated image data of the first dispersed images and outputting a shutter control signal to set a light shielding state in a time for outputting image signals in accordance with image data of the images other than the first dispersed images.

In the second aspect of the present invention, it is preferable that the first dispersed images include many high spatial frequency components if created based on areas with many high spatial frequency components in the first image and include many low spatial frequency components if created based on areas with many low spatial frequency components in the first image. Furthermore, it is preferable that creating image data of a plurality of second dispersed images that form the second image when luminance values are added pixel by pixel based on the image data of the second image; allocating luminance values to arbitrary pixels of the plurality of second dispersed images such that grayscale values of two or more second dispersed images are not grayscale values expressing black; and outputting image signals in accordance with image data of the second dispersed images instead of the image signals in accordance with the image data of the second image are included. In addition, it is more preferable that outputting an image signal of an image other than the second dispersed images between an image signal in accordance with any of the image data of the second dispersed images and an image signal in accordance with any other image data of the second dispersed image signal is included.

In any of the image processing methods of the second aspect of the present invention, it is preferable that outputting an image signal in accordance with image data of a third image while outputting the shutter control signal for setting the light shutter to the light shielding state is included. Furthermore, it is preferable that outputting an image signal of an image other than the first dispersed images between an image signal in accordance with any of the image data of the first dispersed images and an image signal in accordance with any other image data of the first dispersed image signal is included.

To attain the object, a third aspect of the present invention provides an image processing program, causing a substantial computer to execute any of the image processing methods of the second aspect of the present invention.

To attain the object, a fourth aspect of the present invention provides a display device in which reproduction of a secret image from one dispersed image is difficult.

The fourth aspect of the present invention is a display device shown in any of the following 4-1 to 4-3.

4-1: A display device that sequentially displays at least two types of images, the display device by including: a memory that stores the image data of the inputted at least two types of images, a first image and a second image included in the at least two types of images being in a relationship of forming image data of an image not correlated with the first image when luminance values of image data respectively are added pixel by pixel; means for creating image data of a plurality of first dispersed images in which the first image is formed when luminance values are added pixel by pixel based on the image data of the first image and grayscale values different from grayscale values of the first image are allocated to the pixels respectively; and shutter controlling means for outputting a shutter control signal for setting a light shutter to a light transmission state only in a time for displaying images in accordance with the image data of the first dispersed images.

4-2: A display device that sequentially displays at least two types of images, the display device including: a memory that stores the image data of the inputted at least two types of images; means for creating image data of a second image that forms image data of an image not correlated with a first image when the luminance values are added pixel by pixel based on the image data of the first image included in the at least two types of images stored in the memory; means for creating image data of a plurality of first dispersed images in which the first image is formed when luminance values are added pixel by pixel based on the image data of the first image and grayscale values different from grayscale values of the first image are allocated to the pixels respectively; and shutter controlling means for outputting a shutter control signal for setting a light shutter to a light transmission state only in a time for displaying images in accordance with the image data of the first dispersed images.

4-3: A display device that sequentially displays at least two types of images, the display device including: a memory that stores the image data of the inputted at least two types of images, a first image and a second image included in the at least two types of images being in a relationship of forming image data of an image not correlated with the first image when luminance values of image data respectively are added pixel by pixel; means for creating image data of a plurality of first dispersed images in which the first image is formed when luminance values are added pixel by pixel based on the image data of the first image and grayscale values different from grayscale values of the first image are allocated to the pixels respectively; modulating means for multiplying the luminance values by a degree of modulation pixel by pixel, the degree of modulation being one or greater, in the image data of the plurality of first dispersed images; and shutter controlling means for setting a transmittance of a light shutter to a value in which a maximum transmittance is multiplied by an inverse of the degree of modulation in a time for displaying images in accordance with the modulated image data of the second dispersed images and for outputting a shutter control signal to set a light shielding state in a time for displaying images in accordance with image data of the images other than the first dispersed images.

In the fourth aspect of the present invention, it is preferable that the first dispersed images include many high spatial frequency components if created based on areas with many high spatial frequency components in the first image and include many low spatial frequency components if created based on areas with many low spatial frequency components in the first image. Furthermore, it is preferable that means for creating image data of a plurality of second dispersed images that form the second image when luminance values are added pixel by pixel based on the image data of the second image; allocating luminance values to arbitrary pixels of the plurality of second dispersed images such that grayscale values of two or more second dispersed images are not grayscale values expressing black; and displaying images in accordance with image data of the second dispersed images instead of the image in accordance with the image data of the second image are included. In addition, it is more preferable that displaying an image other than the second dispersed images between an image in accordance with any of the image data of the second dispersed images and an image in accordance with any other image data of the second dispersed image signal is included.

In any of the configurations of the fourth aspect of the present invention, it is preferable that displaying an image in accordance with image data of a third image while outputting the shutter control signal for setting the light shutter to the light shielding state is included. Furthermore, it is preferable that displaying an image other than the first dispersed images between an image in accordance with any of the image data of the first dispersed images and an image in accordance with any other image data of the first dispersed images is included.

To attain the object, a fifth aspect of the present invention provides an image display system using the display device according to any of the configurations of the fourth aspect of the present invention, the image display system including: a light shutter that is set to a light transmission state or a light shielding state in accordance with the shutter control signal.

[Operation]

According to the present invention, not only is the secret image dispersed pixel by pixel or area by area but the grayscale values of the pixels are also dispersed. Therefore, the degree of freedom of the image dispersion increases, and regardless of the type of image, the secret image will not easily become apparent by intentional blinking or by use of camera.

Creating the dispersed images of the secret image such that areas with many high spatial frequency components in the secret image include many high spatial frequency components and areas with many low spatial frequency components include many low spatial frequency components enables to make the estimation of the secret image from one dispersed image difficult, thereby more robustly protecting the content of the secret image.

According to the present invention, the secret image can be perceived not by simply adding the values of the dispersed images, but by modulating the values by certain constants and then removing the modulation by the light shutter. Therefore, if the degree of modulation of the dispersed images is not known, reproduction of the secret image from the dispersed images is difficult even if continuous shooting is performed with a camera with short shutter time, and the content of the secret image is more robustly protected.

Effect of the Invention

According to the present invention, an image processing apparatus, an image processing method, a program thereof, a display device, and an image display system regardless of the type of image can be provided, in which a secret image does not easily become apparent even by intentional blinking or by use of camera, and in which it is difficult to reproduce the secret image from dispersed images even if continuous shooting is performed with a camera with short shutter time.

BEST MODE FOR CARRYING OUT THE INVENTION

[Principle of the Invention]

A dispersion method of secret image according to a conventional art disperses a secret image pixel by pixel or area by area. In that case, the secret image may be estimated from a dispersed image in an area with relatively small gradation change between adjacent pixels included many in a natural image.

A case will be considered as an example in which a secret image is divided into four dispersed images and the sum of the four images forms the secret image. To create the dispersed image, the secret image is divided into partial areas of 2 pixels×2 pixels. A first dispersed image only displays the grayscale of the lower-right pixel, and the values of other pixels are set to 0 (i.e., black). A second dispersed image only displays the upper-right grayscale, a third dispersed image only displays the upper-left grayscale, and a fourth dispersed image only displays the lower-left grayscale.

FIG. 2 illustrates a specific example in which four dispersed images are created with the above method. FIG. 2(a) depicts dispersed images in which a secret image depicted with black "A" on a white background at the far left is dispersed. FIG. 2(b) depicts dispersed images in which a secret image depicted with white "A" on a black background at the far left is dispersed. The dispersed images include, from the left, a first dispersed image, a second dispersed image, a third dispersed image, and a fourth dispersed image.

It can be seen in both of FIGS. 2(a) and 2(b) that it is impossible to solely determine (as "A") the secret image from the obtained dispersed images, and the estimation is also significantly difficult. Therefore, a dispersion method similar to a conventional method is still effective if the features of the secret image and the features of the dispersion method (the features will be described below) match.

On the other hand, the secret image can be estimated in the conventional dispersion method such as in case of a gradation image, in which grayscale values of the pixels gradually spatially change and the change of the grayscale values is distinct, or in which the features of the shape (size, thickness) and grayscale values are different in even case of the characters.

Figure 3:
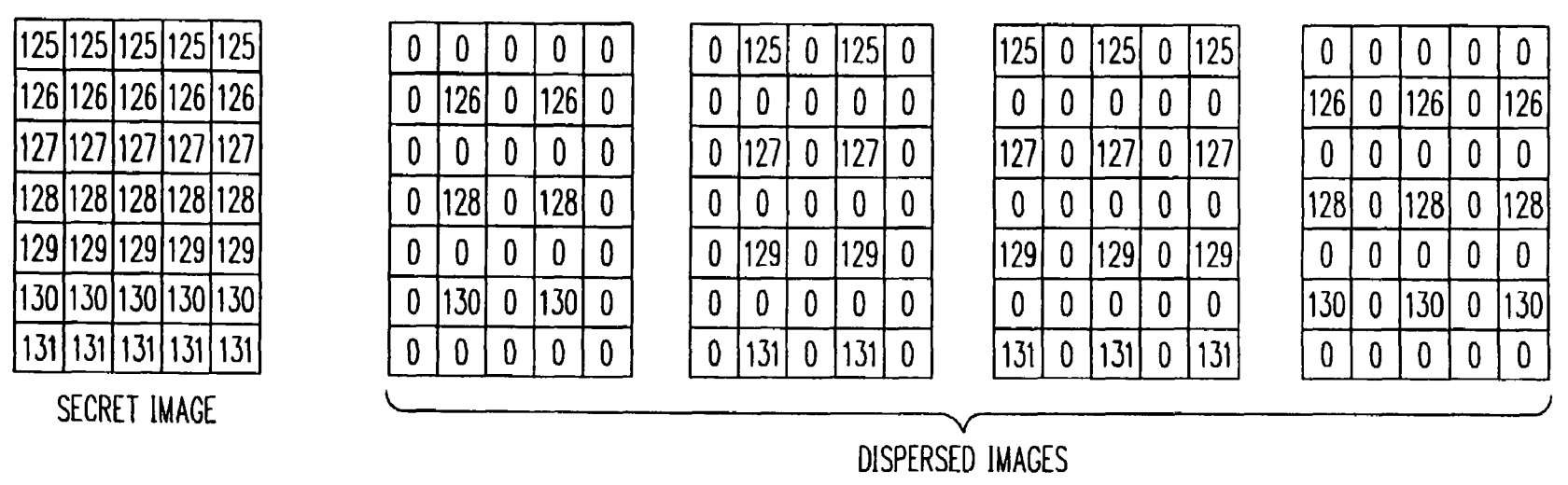

FIG. 3 shows dispersed images created with the same method as in FIG. 2 from a secret image, which is a gradation image, in which the grayscale value changes by one grayscale for each time the grayscale value changes by one pixel in the longitudinal direction. In FIG. 3, the numbers in the rectangles indicating the pixels denote grayscale values. With reference to the dispersed images of FIG. 3, it can be seen that the estimation is possible by looking at the grayscale values other than black that the grayscale values sequentially increase from top to bottom in the images.

Obviously, even in the case of gradation image, if the number of images dispersed from the secret image is increased (the number of dispersions of the dispersed images is increased), the estimation of the secret image from one dispersed image will be difficult. However, if the number of dispersions is increased, the time of displaying "black" in pixels within a certain time (for example, within one frame time) becomes longer, resulting in a problem that the secret image turns dark.

For example, if the number of dispersions is four as shown in FIGS. 2 and 3, other than black is only displayed in one time among the four times in which the four dispersed images are displayed, and the luminance is one fourth. In general, by increasing the number of dispersions, the proportion of areas displaying the secret image in one dispersed image is a value in which one is divided by the number of dispersions.

If the number of dispersions is further increased, rewriting is performed at least for the number of times of the dispersions in one frame time (usually 1/60 second). Therefore, the driving performance (image rewriting speed) needs to be increased, but there is a limit to it. If the driving performance is not increased, the cycle of displaying the pixels of a certain dispersed image becomes longer, causing conspicuous flicker (flash of light).

Therefore, the approach of making the estimation of the secret image from the dispersed images difficult by increasing the number of dispersions is not practical as another problem to be solved occurs.

Even if the dispersion method is changed without changing the number of dispersions of the gradation image, the proportion of the areas where the secret image is displayed in one dispersed area remains one fourth. Therefore, the problem that the gradual gradation changes can be estimated remains as it is.

If the secret image is distinct in shape (difference in gradation between adjacent pixels is large and the correlation is not so high), it is difficult to interpolate the gradations of surrounding pixels from dispersively displayed pixels. However, if the secret image is distinct in gradation change (difference in grayscale between adjacent pixels is small and the correlation is relatively high), it is possible to interpolate the grayscale values of the surrounding pixels from the dispersively displayed pixels.

Therefore, in a generating method of dispersed images of the secret image of the present invention, the dispersion is not performed pixel by pixel or area by area, but instead, the grayscales of the pixels of the secret image are dispersed (in other words, temporally dispersed) to make the estimation of the secret image from one dispersed image difficult regardless of the image.

In the grayscale dispersion method, the sum of the grayscale values of the dispersed pixels is not the grayscale values of the pixels of the secret image. Instead, the sum of the luminance corresponding to the grayscale values of the dispersed pixels is equal to the luminance corresponding to the grayscale values of the pixels of the secret image. This is because human eyes function to temporally integrate the luminance.

FIG. 4 is a diagram of an example in which the grayscales of the gradation image are dispersed. The underlined numbers in the pixels indicated by rectangles in FIG. 4 denote luminance values for convenience, not the grayscale values. It is clear that the same result can be obtained by performing grayscale-luminance conversion in case of the grayscale values.

To create the dispersed images, the secret image is divided into partial areas of 4 pixels×4 pixels, and the pixels of the partial areas are multiplied by four dispersed image creating matrices shown in FIG. 5(a). For example, the luminance value of the uppermost left pixel of the secret image is "125", and the upper-left value of the leftmost dispersed image creating matrix is "0.33". Therefore, the obtained luminance value of the dispersed image is 125×0.33≈41. The matrix sum of four constant matrices is 1 in all matrix elements, and the secret image is reproduced by adding the dispersed images.

All of the dispersed images shown in FIG. 4 macroscopically include patterns (gradations) of 4 pixels×4 pixels cycle, and the estimation of the secret image from the images is difficult.

The application of the dispersed image creating matrices shown in FIG. 5(a) to the characters shown in FIG. 2 enables to estimate the secret image from one dispersed image. In a mode for solving the problem, dispersed image creating matrices as shown in FIG. 5(b) are used for an area of character (or area with large difference in grayscale between adjacent pixels), and the dispersed image creating matrices as shown in FIG. 5(a) are used for an area with small difference in grayscale between adjacent pixels. The matrices of FIG. 5(b) are matrices for obtaining the dispersed images shown in FIGS. 2 and 3.

Using suitable dispersed image creating matrices area by area enables to make it difficult to estimate the secret image from one dispersed image regardless of the image.

Considering the result from the standpoint of spatial frequency component of image, if a dispersed image creating matrix including many high spatial frequency components is used for an area of the secret image including many high spatial frequency components (including many characters or fine lines) and a dispersed image creating matrix including many low spatial frequency components is used for an area including many low spatial frequency components (including many gradations, solid pictures, or thick lines), it is difficult to estimate the secret image from one dispersed image due to the masking effect of the spatial frequency components.

At least the grayscale of each pixel of the secret image needs to be dispersed to create the above dispersed images.

To hide the secret image from a nonuser of a light shutter, it is necessary to display a reverse image which is an image not correlated with the secret image after the addition. However, the reverse image is usually highly correlated with the secret image. For example, if an image obtained by reversing the luminance of the color components of the secret image is set as the reverse image, the additional values form a gray color all over. Although the synthetic image is not correlated with the secret image, the secret image can be easily estimated from the reverse image.

To avoid the estimation of the secret image from the reverse image, means for using the dispersed image creating matrices to the reverse image in the same way as to the secret image to create dispersed images of the reverse image may be further installed. This enables to more robustly protect the content of the secret image.

The reverse image may be created by reversing the luminance of the color components of the secret image, or an image, which is created to form an image not correlated with the secret image by performing addition with the luminance reversal or by another process, may be acquired and used with an arbitrary method.

The secret image may be able to be perceived by modulating the dispersed images by certain constants and removing the modulation by the light shutter, not by simply adding the values of the dispersed images. As described below, since the degrees of the combinations of the image representation increase by (time modulation×luminance modulation), the content of the secret image can be more robustly protected.

As shown in FIG. 6, a case of dispersing a secret image S into two images A and B will be considered. A reverse image of the secret image A is illustrated as (−A), a reverse image of the secret image B is illustrated as (−B), and an image obtained by adding a secret image and a reverse image is illustrated as a gray image G. In the conventional method shown in FIG. 6(a), a perceptual image including a public image C is A+(−A)+B+(−B)+C=C+2G in a case without spectacles, and a perceptual image is A+B=S in a case with spectacles.

In this case, if the display time of A and B becomes apparent, the secret image is reproduced. In a configuration of the present invention shown in FIG. 6(b), the luminance of the secret image B is displayed with 2B, which is twice as much luminance. In the case without spectacles, the result is A+(−A)+2B+(−2B)+C=C+3G, and only the public image remains to be perceived. However, in the conventional spectacles without modulation, the result is A+2B≠S, and the secret image cannot be reproduced.

The secret image can be reproduced by adding the dispersed images such that A+(0.5×2B)=S is obtained only after recognizing not only the display time but also the degree of modulation of the brightness such as by halving the transmittance of the shutter spectacles during the display time of the secret image B.

Obviously, it is more effective to not only modulate the luminance of the secret image B, but also to modulate the luminance of the secret image A as well as to modulate the transmittance of the shutter spectacles accordingly. The modulation of the secret image and the corresponding shutter spectacles may be performed not only periodically, but may also be randomly set under the condition that the total of the gray image G is constant.

Thus, if the degree of modulation of the dispersed images is not known, it is difficult to reproduce the secret image from the dispersed images even when the continuous shooting is performed with a camera with short shutter time, enabling robust protection of the content of the secret image.

Applying the above method to an apparatus illustrated below enables to robustly protect the content of the secret image.

In an image processing apparatus under the condition that the secret image is formed by luminance additional values of the pixels of a plurality of dispersed images, By including dispersed image creating means capable of performing allocation to arbitrary pixels of the plurality of dispersed images such that the grayscale values are not the grayscale expressing black in two or more dispersed images (in other words, the allocation is performed such that a combination of an image to be the same as the secret image and a black image is not formed), the estimation of the secret image from one dispersed image become difficult, thereby realizing robust protection of the secret image.

Furthermore, by configuring a display device including the image processing apparatus, a display device realizing robust protection of the secret image can be formed.

The above described method can also be executed by a software process by a computer. As a result, special hardware may not be required, and a change in specification or the like can be easily handled.

Preferred embodiments of the present invention based on the above principle will now be described.

[First Exemplary Embodiment]

A first exemplary embodiment preferably implementing the present invention will be described. FIG. 7 shows a configuration of an image processing apparatus according to the present embodiment. The image processing apparatus is a specific apparatus that executes processes based on the principle of the present invention and includes a memory 101, a dispersed image creating/data allocating circuit 102, and a shutter spectacle control signal creating circuit 103. The memory 101 stores sequentially inputted secret image, reverse image, and public image. The dispersed image creating/data allocating circuit 102 disperses the gradations of a secret image S among the secret image S, reverse image R, and public image P sequentially outputted from the memory 101 based on a synchronization signal to create dispersed images. The shutter spectacle control signal creating circuit 103 controls light transmission state/light shielding state of the shutter spectacles based on an inputted synchronization signal. An output signal of the memory 101 is designated with reference numeral 111. An output signal of the dispersed image creating/data allocating circuit 102 is designated with reference numeral 112. An output signal of the shutter spectacle control signal creating circuit 103 is designated with reference numeral 113.

The secret image S, the reverse image R, and the public image P stored in the memory 101 are transmitted to the dispersed image creating/data allocating circuit 102. The dispersed image creating/data allocating circuit 102 creates a plurality of dispersed images from the secret image S and then allocates data of the dispersed images, the reverse image R, and the public image P to each time period and outputs the data to the display device.

FIG. 8 shows a configuration of the dispersed image creating/data allocating circuit 102. The dispersed image creating/data allocating circuit 102 includes a dispersed image creating matrix creating circuit 122, a dispersed image creating circuit 123, and a data allocating circuit 121.

The dispersed image creating circuit 123 divides the inputted secret image S into a plurality of dispersed images S1 and S2 based on dispersed image creating matrices created in the dispersed image creating matrix creating circuit 122 and transmits the dispersed images S1 and S2 to the data allocating circuit 121. The reverse image R and the public image P are transmitted to the data allocating circuit 121 as it is.

FIG. 9 shows an example of a timing chart of one frame time of the output signals 111, 112, and 113. A process of the data allocating circuit 121 will be described based on the timing chart. Although a configuration is described herein in which the number of dispersions (the number of dispersed images) of the secret image is 2 and the secret image is dispersed into S1 and S2, it is obvious that the number of dispersions can be arbitrarily set.

The plurality of dispersed images S1 and S2 created from the secret image S, the reverse image R, and the public image P are inputted to the data allocating circuit 121. The data allocating circuit 121 allocates data of the dispersed images S1 and S2 of the secret image in times Ton1 and Ton2 and allocates data of the reverse image R and the public image P in times Toff1 and Toff2. The dispersed images S1 and S2 of the secret image and the reverse image R are in a relationship of forming an image not correlated with the secret image S when the calculation of S1+S2+2R is performed to each pixel.

In the time Ton1, as for the pixels of the screen, the grayscale values of the S1 image as a first dispersed image of the secret image are first transmitted to the display device in a data writing time W. After that, until the next writing time W, light emission (in case of a light-emitting display such as a plasma display and an organic electroluminescence display), a light transmission state (in case of a light-controlled display such as a display using an MEMS switch and a liquid crystal display), or a non-emitting/light shielding state of the pixels is maintained.

In the time Toff1, the data of the reverse image R and the public image P are allocated by the same procedure (writing and maintaining light emitting/light transmission state) as the first dispersed image S1, and the grayscales of the images are reproduced.

Also in the times Ton2 and Toff2, the data of the second dispersed image S2 and the reverse image R are allocated with the same procedure, and the grayscales of the images are reproduced.

The output signal 113 transmitted to the shutter spectacles is a signal that sets the shutter spectacles to a light transmission state in the times Ton1 and Ton2 and that sets the shutter spectacles to a light shielding state in the times Toff1 and Toff2. The output signal 113 is created in the shutter spectacle control signal creating circuit 103 based on the synchronization signal of image.

Although the data allocating circuit 121 outputs the dispersed images S1 and S2 of the secret image, the reverse image R, and the public image P during one frame time, the order is only an example and is basically arbitrary.

For example, as shown in FIG. 10, even if the time of R in the time Toff2 and the time of P in the last part of the time Toff1 in the timing chart of FIG. 9 are switched, the image perceived by a person wearing the shutter spectacles and the image perceived by a person not wearing the shutter spectacles do not change. As long as the output signal of the shutter spectacle control signal creating circuit 103 is created, the order of the dispersed images S1 and S2 of the secret image, the reverse image R, and the public image P may be basically arbitrary. However, it is preferable to insert the reverse image R or the public image P between the dispersed images S1 and S2. This is because if the dispersed images are placed adjacent to each other (displayed continuously), the temporal integration can be easily performed, and the secret image may be perceived without using the shutter spectacles.

As described, the estimation of the secret image from one dispersed image is made difficult by dispersing the grayscales of the secret image in the dispersed image creating/data allocating circuit 102, allocating the data such that the dispersed images are displayed temporally spaced apart, and setting the shutter spectacles to the light transmission state during the display times of the dispersed images S1 and S2. As a result, the content of the secret image can be robustly protected.

[Second Exemplary Embodiment]

A second exemplary embodiment preferably implementing the present invention will be described. FIG. 11 shows a configuration of an image processing apparatus according to the present embodiment. The image processing apparatus according to the present embodiment is substantially configured in the same way as the image processing apparatus according to the first exemplary embodiment, but is different from the first exemplary embodiment in that a reverse image creating unit 104 is included. The reverse image creating unit 104 receives the secret image S from the memory 101 and creates and outputs the reverse image R.

The reverse image creating unit 104 creates a reverse image that conceals the secret image based on the grayscale values of the secret image. Specifically, the reverse image creating unit 104 obtains the luminance of the reverse image such that the luminance during the "white" display in the secret image is formed when the addition with the secret image is performed pixel by pixel and creates corresponding grayscale values. In general, the γ-characteristic of the display device is taken into consideration in the grayscale value of an image signal, and a nonlinear value is allocated to the luminance. Therefore, when performing the addition, the calculation is performed after conversion to the luminance value, and then the calculation for setting back to the grayscale value is performed (γ-correction). Creating such a reverse image in the image processing apparatus makes it unnecessary to store the reverse image in the memory 101, enabling to reduce the memory capacity.

The above configuration enables to reduce the capacity of a costly memory 101 and further enables to realize the same effects as in the first exemplary embodiment.

[Third Exemplary Embodiment]

A third exemplary embodiment preferably implementing the present invention will be described. FIG. 12 shows a configuration of an image processing apparatus according to the present embodiment. The image processing apparatus is configured substantially the same way as the image processing apparatus according to the first exemplary embodiment, but the process in a dispersed image creating/data allocating circuit 102A is different. In the present embodiment, the content of the image is determined in an image determining circuit when creating the dispersed images, and the dispersed image creating matrices are selected based on the result.

FIG. 13 shows a configuration of the dispersed image creating/data allocating circuit 102A. The dispersed image creating/data allocating circuit 102A includes the dispersed image creating matrix creating circuit 122, the dispersed image creating circuit 123, an image determining circuit 124, and the data allocating circuit 121. The image determining circuit 124 determines whether the spatial frequency of image in each of the partial areas (for example 8 pixels×8 pixels) of the inputted secret image includes many high spatial frequency components or includes many low spatial frequency components and outputs the determination result to the dispersed image creating matrix creating circuit 122. A known method using a discrete Fourier transformation process can be applied for the determination.

Based on the determination result of the image determining circuit 124, the dispersed image creating matrix creating circuit 122 selects dispersed image creating matrices suitable for an image including many low spatial frequency components or dispersed image creating matrices suitable for an image including many high spatial frequency components and outputs the selected matrices to the dispersed image creating circuit 123. The dispersed image creating circuit 123 applies the dispersed image creating matrices inputted from the dispersed image creating matrix creating circuit 122 to the partial areas serving as the basis of the determination to obtain the dispersed images S1 and S2. An example of the dispersed image creating matrices suitable for an image including many low spatial frequency components includes the matrices shown in FIG. 6(a), while an example of the dispersed image creating matrices suitable for an image including many high spatial frequency components includes the matrices shown in FIG. 6(b).

A case of determining whether the image includes many high spatial frequency components or includes many low spatial frequency components has been described as an example of a determination method in the image determining circuit 124. However, the method is not limited to this. For example, the type of the dispersed image creating matrices may be changed based on the difference in grayscale of adjacent pixels in the image. As long as an image from which the estimation of the partial area image from the multiplication result image of the dispersed image creating matrices is difficult (low correlation) and the partial area image can be obtained, the matrices used for the image determining method or the dispersed image creation are arbitrary.

Although the partial areas are 8 pixels×8 pixels in the present embodiment, the size is not limited to this. The size of the partial areas can be arbitrarily set in consideration of the complexity of process or the dispersed image creating matrices used.

Other operations are the same as the first exemplary embodiment, and the description will not be repeated.

As described, extracting the features of image of the partial areas and changing the dispersed image creating matrices used based on the features enable to obtain suitable dispersed images finer than in the image processing apparatus of the first exemplary embodiment and enables to more robustly protect the content of the secret image.

[Fourth Exemplary Embodiment]

A fourth exemplary embodiment preferably implementing the present invention will be described. FIG. 14 shows a configuration of an image processing apparatus according to the present embodiment. The image processing apparatus according to the present embodiment is configured substantially in the same way as the image processing apparatus according to the third exemplary embodiment, but a processing method in a dispersed image creating/data allocating circuit 102B is different. In the present embodiment, dispersed images of not only the secret image, but also of the reverse image are created.

FIG. 15 shows a configuration of the dispersed image creating/data allocating circuit 102B. The dispersed image creating/data allocating circuit 102B includes the dispersed image creating matrix creating circuit 122, the dispersed image creating circuit 123, the image determining circuit 124, a reverse dispersed image creating matrix creating circuit 125, a reverse dispersed image creating circuit 126, a reverse image determining circuit 127, and the data allocating circuit 121.

Among these, the dispersed image creating matrix creating circuit 122, the dispersed image creating circuit 123, and the image determining circuit 124 are function units for creating the dispersed images of the secret image. The reverse dispersed image creating matrix creating circuit 125, the reverse dispersed image creating circuit 126, and the reverse image determining circuit 127 are function units for creating the dispersed images of the reverse image. The reverse image determining circuit 127 determines whether the spatial frequency of image of each of the partial areas of the inputted reverse image includes many high spatial frequency components or includes many low spatial frequency components and outputs the determination result to the reverse dispersed image creating matrix creating circuit 125.

Based on the determination result of the reverse image determining circuit 127, the reverse dispersed image creating matrix creating circuit 125 selects the dispersed image creating matrices suitable for an image including many low spatial frequency components or the dispersed image creating matrices suitable for an image including many high spatial frequency components and outputs the selected matrices to the reverse dispersed image creating circuit 126. The reverse dispersed image creating circuit 126 applies the dispersed image creating matrices inputted from the reverse dispersed image creating matrix creating circuit 125 to the partial areas determined by the reverse image determining circuit 127 to thereby obtain reverse dispersed images R1 and R2.

FIG. 16 shows an example of a timing chart of one frame time of output signals 111, 112B, and 113 in the present embodiment. A configuration is described herein in which the number of dispersions of the secret image is set to 2, and the dispersion of the secret image into the dispersed images S1 and S2 is performed. Furthermore, the number of dispersions of the reverse image is set to 2, and the dispersion of the reverse image into the dispersed images R1 and R2 is performed. However, the numbers of dispersions can be arbitrarily set.

The difference from the timing chart in the image processing apparatus according to the first exemplary embodiment shown in FIG. 10 is that the reverse image R is dispersed into the dispersed images R1 and R2. However, as in the dispersed images S1 and S2 of the secret image in the first exemplary embodiment, it is preferable to insert the dispersed images S1 and S2 of the secret image or the public image P between the dispersed images R1 and R2 of the reverse image. This is because the reverse image can be easily recognized due to the temporal integration if the dispersed images of the reverse image are temporally placed adjacent to each other (if the dispersed images of the reverse image are continuously displayed).

Other configurations are the same as the third exemplary embodiment, and the description will not be repeated.

The dispersion of the reverse image in the same way as the dispersion of the secret image makes it difficult to estimate the secret image from the reverse image, enabling to more robustly protect the content of the secret image.

The dispersed image creating matrices and the reverse dispersed image creating matrices may be the same matrices. In that case, as shown in FIG. 17, the dispersed image creating matrix creating circuit 122 and the dispersed image creating circuit 123 may be shared for the secret image and the reverse image.

[Fifth Exemplary Embodiment]

A fifth exemplary embodiment preferably implementing the present invention will be described. FIG. 18 shows a configuration of a display device according to the present embodiment. Without a specific limitation, a plasma display, a display using an MEMS switch, an organic electroluminescence display, or a fast response liquid crystal display may be applied as the display device.

The display device is a specific device that executes processes based on the principle of the present invention and includes a memory 201, a display controller 202, a shutter signal creating circuit 203, and a display unit 204. The memory 201 stores sequentially an inputted secret image S, reverse image R, and public image P. The display controller 202 creates dispersed images of at least the secret image S among the secret image S, the reverse image R, and the public image P included in an output signal 211 sequentially outputted from the memory 201 based on a synchronization signal, allocates data to display on the display unit 204, and creates an output signal (control signal and image signal) 212 for driving the display unit 204. Based on the inputted synchronization signal, the shutter spectacle control signal creating circuit 203 creates an output signal 213 for controlling the light transmission state/light shielding state of the shutter spectacles.

The display controller 202 is the same as the dispersed image creating/data allocating circuit 102 in the first exemplary embodiment, except that a control signal for driving the display unit 204 is included in the output signal 212.

As in the present embodiment, building the process by the dispersed image creating/data allocating circuit 102 of the first exemplary embodiment into the display controller 202 enables to incorporate the dispersed image creating/data allocating process into the display device.

This enables to realize a display device capable of displaying while robustly protecting the content of the secret image without someone else (person not wearing the shutter spectacles) seeing the secret image.

Although an example of a display device that executes the same processes as the image processing apparatus according to the first exemplary embodiment has been described, it is obvious that a display device that executes the same processes as the image processing apparatus of another embodiment can also be realized in the same way.

[Sixth Exemplary Embodiment]

A sixth exemplary embodiment preferably implementing the present invention will be described. In the present embodiment, the image processing is executed by a software process using a computer. Specifically, an image processing unit 131 shown in FIG. 19 is configured by a software process of a substantial computer.

FIGS. 20 and 21 show a flow of the image processing in the image processing unit 131. The number of dispersions of the secret image is set to 4 in the image processing illustrated herein. In the process, a secret image Sin, a reverse image Rin, and a public image Pin that are 8-bit raster images are inputted, dispersed images S1 to S4 are created from the secret image Sin, and a data allocation and shutter control signal is created. Relating the image processing to the processes by the components of the image processing apparatus of the third exemplary embodiment, steps S3 to S5 are equivalent to the process in the image determining circuit 124, steps S6 and S7 are equivalent to the process in the dispersed image creating matrix creating circuit 122, steps S8 and S9 are equivalent to the process in the dispersed image creating circuit 123, step S12 is equivalent to the process in the data allocating circuit 121, and steps S13 to S15 are equivalent to the process in the shutter spectacle control signal creating circuit 103.

When the secret image Sin, the reverse image Rin, and the public image Pin (8 bits) are inputted to the image processing apparatus (step S1), the image processing unit 131 extracts information, i.e. XY coordinates of pixel, that indicates of which pixel an inputted image signal is (step S2).

[Image Determining Process]

The image processing unit 131 first divides Sin into 8 pixels×8 pixels partial areas Sr (step S3). The image processing unit 131 then extracts spatial frequency components Fr of the partial areas Sr (step S4). The image processing unit 131 determines whether the spatial frequency components Fr obtained in step S4 include many high spatial frequency components or include many low spatial frequency components (step S5).

[Dispersed Image Creating Matrix Creating Process]

If the spatial frequency components Fr include many high spatial frequency components (step S5/Yes), the image processing unit 131 selects dispersed image creating matrices including many high spatial frequency components as M1 to M4 (step S6). On the other hand, if the spatial frequency components Fr include many low spatial frequency components (step S5/No), the image processing unit 131 selects dispersed image creating matrices including many low spatial frequency components as M1 to M4 (step S7).

[Dispersed Image Creating Process]

The image processing unit 131 extracts constants for dispersing the grayscales based on the values of X and Y from the matrices M1 to M4 obtained in the dispersed image creating matrix creating process. Values of (Y mod 4)+1 row and (X mod 4)+1 column are used herein (step S8). The image processing unit 131 multiplies the obtained constants and the secret image Sin to obtain the dispersed images S1, S2, S3, and S4 (step S9).

The image processing unit 131 executes the processes between step S4 and step S9 to the entire image to obtain the dispersed images (step S10).

[Data Allocating Process]

As the number of dispersions of the secret image is 4, the image processing unit 131 time-shares one frame into eight subframes (step 511). The image processing unit 131 selects and outputs an image depending on the order of a currently outputting subframe. Specifically, the image processing unit 131 selects first: S1, second: Rin, third: S2, fourth: Pin, fifth: S3, sixth: Rin, seventh: S4, and eighth: Pin. The dispersed images of the secret image are not placed adjacent to each other (step S12). The luminance addition result image of pixels S1+S2+S3+S4+2R is designed not to be an image correlated with the secret image.

[Shutter Control Signal Creating Process]

The image processing unit 131 checks whether the selected image is a dispersed image (step S13). If the selected image is a dispersed image (step S13/Yes), the image processing unit 131 outputs a control signal for setting the shutter spectacles to a transmission state (step S14). On the other hand, if the selected image is not a dispersed image (step S13/No), the image processing unit 131 outputs a control signal that sets the shutter spectacles to a light shielding state (step S15).

Executing the processes in steps S1 to S15 by software processing of a computer enables to implement an image processing method similar to the image processing apparatus according to the third exemplary embodiment without using special hardware.

The image processing unit 131 can be configured not only by a general software process in which a CPU executes a program with a RAM as a work area, but also by a software process by a computer, such as a DSP, in which a program is incorporated as hardware. Thus, any type can be used as long as it is a substantial computer.

Although the flow chart shown in FIGS. 20 and 21 is for executing image processing similar to the process by the image processing apparatus according to the third exemplary embodiment of the present invention, the software processing using a computer can also execute the image processing similar to the processes by the image processing apparatuses in the first exemplary embodiment, the second exemplary embodiment, or the fourth exemplary embodiment.

[Seventh Exemplary Embodiment]

A seventh exemplary embodiment preferably implementing the present invention will be described. FIG. 22 shows a configuration of an image processing apparatus according to the present embodiment. The image processing apparatus is substantially the same as the image processing apparatus according to the first exemplary embodiment, but the processes in a dispersed image creating/data allocating circuit and a shutter spectacle control signal creating circuit 103C are different. In the present embodiment, when creating the dispersed images, a multiplication process based on the degree of modulation is executed in addition to the multiplication process for dispersing the grayscales to control to decrease the transmittance T of the shutter spectacles to a value in which the transmittance is multiplied by an inverse of the degree of modulation.

FIG. 23 shows a configuration of a dispersed image creating/data allocating circuit 102C. Differences from the dispersed image creating/data allocating circuit 102 of the image processing apparatus according to the first exemplary embodiment are that a multiplier is installed between the dispersed image creating matrix circuit 122 and the dispersed image creating circuit 123 and that an output of the dispersed image creating matrix creating circuit 122 and a multiplication result of the degree of modulation are outputted to the dispersed image creating circuit 123.

The degree of modulation is a value "mo" that is 1 or greater, or is a value "1". Specifically, mo is set if a matrix for S1 is selected as a dispersed image creating matrix, while 1 is set if a matrix for S2 is selected.

FIG. 24 shows an example of a timing chart of one frame time including an output signal 113C of the shutter spectacle control signal creating circuit 103C. Differences from FIG. 9 as a timing chart of the image processing apparatus according to the first exemplary embodiment are that S1 as a dispersed image among the output signals 112C transmitted to the display device is multiplied by the degree of modulation mo and that the output signal 113C of the shutter spectacle control signal creating circuit 103C is modulated such that the transmittance of the light shutter at the time is T/mo.

The image perceived through the light shutter in this case is as follows.

$$(S1 \times mo) \times (T/mo) + S2 \times T = (S1 + S2) \times T = S \times T$$

Since the secret image S is a sum of the dispersed images S1 and S2, the secret image can be perceived by seeing the display device through the light shutter.

On the other hand, the secret image S cannot be reproduced by obtaining an arbitrary image with a camera with high-speed shutter and obtaining the sum of S1×mo and S2. This is because another parameter, the degree of modulation mo, which cannot be recognized just by photographing with a camera, is included in a dispersed image S1.

Although an example has been described in which the degree of modulation of the dispersed image S2 is 1, it is clear that the degree of modulation of the dispersed image S2 is arbitrary.

Other operations are the same as the first exemplary embodiment, and the description will not be repeated.

Relating and modulating the luminance of the dispersed images and the transmittance of the light shutter enables to more robustly protect the content of the secret image, as it is difficult to reproduce the secret image from the dispersed images even if continuous shooting is performed with a camera with short shutter time as long as the degree of modulation of each dispersed image is not known.

The above embodiments are examples of the preferred embodiments of the present invention, and the present invention is not limited to these.

For example, although RGB signals are not specifically described in the embodiments, it is obvious that parallel implementation of the configurations shown in the embodiments to the signal components enables to apply the present invention to color images as well. However, the raster images are not necessarily color images made of a plurality of colors of image signals, but may be one-colored images. Thus, there is no need to implement the configurations shown in the embodiments in parallel for each color.

Although an example of a configuration has been described in which shutter spectacles are used to perceive the secret image, there is no need to limit the configuration to the spectacles. Any example may be implemented as long as light shielding means (shutter) is arranged between display means and eyes.

As described, various modifications can be made in the present invention.

This application is based upon and claims the benefit of priority from Japanese patent application No. 2006-234474, filed on Aug. 30, 2006, the disclosure of which is incorporated herein in its entirety by reference.

BRIEF DESCRIPTION OF THE DRAWINGS

FIG. 1 is a diagram of a configuration of a conventional image processing apparatus;

FIG. 3 is a diagram of an example of dispersed images dispersed in the conventional method when the secret image is a gradation image;

FIG. 4 is a diagram of an example of the dispersed images by a method of the present invention when the secret image is a gradation image;

FIG. 5 is a diagram of an example of dispersed image creating matrices by the method of the present invention;

FIG. 6 is a diagram of a relationship between modulation of dispersed images and shutter modulation;

FIG. 7 is a diagram of a configuration of an image display device according to a first exemplary embodiment preferably implementing the present invention;

FIG. 9 is an example of a timing chart of control signals of the image processing apparatus according to the first exemplary embodiment;

FIG. 10 is another example of a timing chart of the control signals of the image processing apparatus according to the first exemplary embodiment;

DESCRIPTION OF SYMBOLS

Figure 2A:
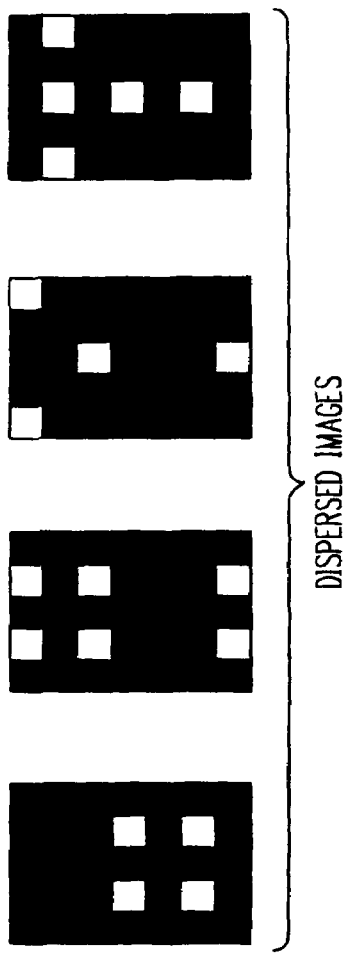
FIG. 2 is a diagram of an example of dispersed images dispersed in a conventional method when a secret image is a character image.
Figure 2B:
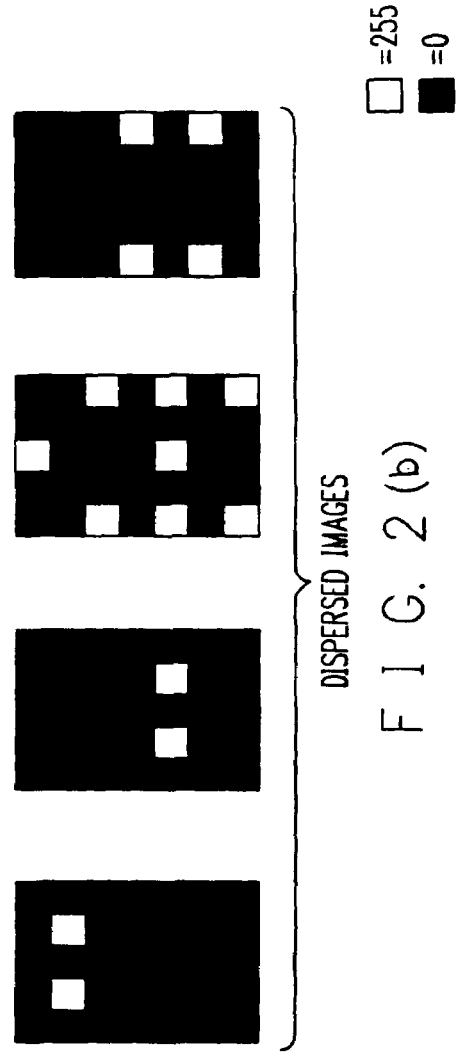
Figure 8:
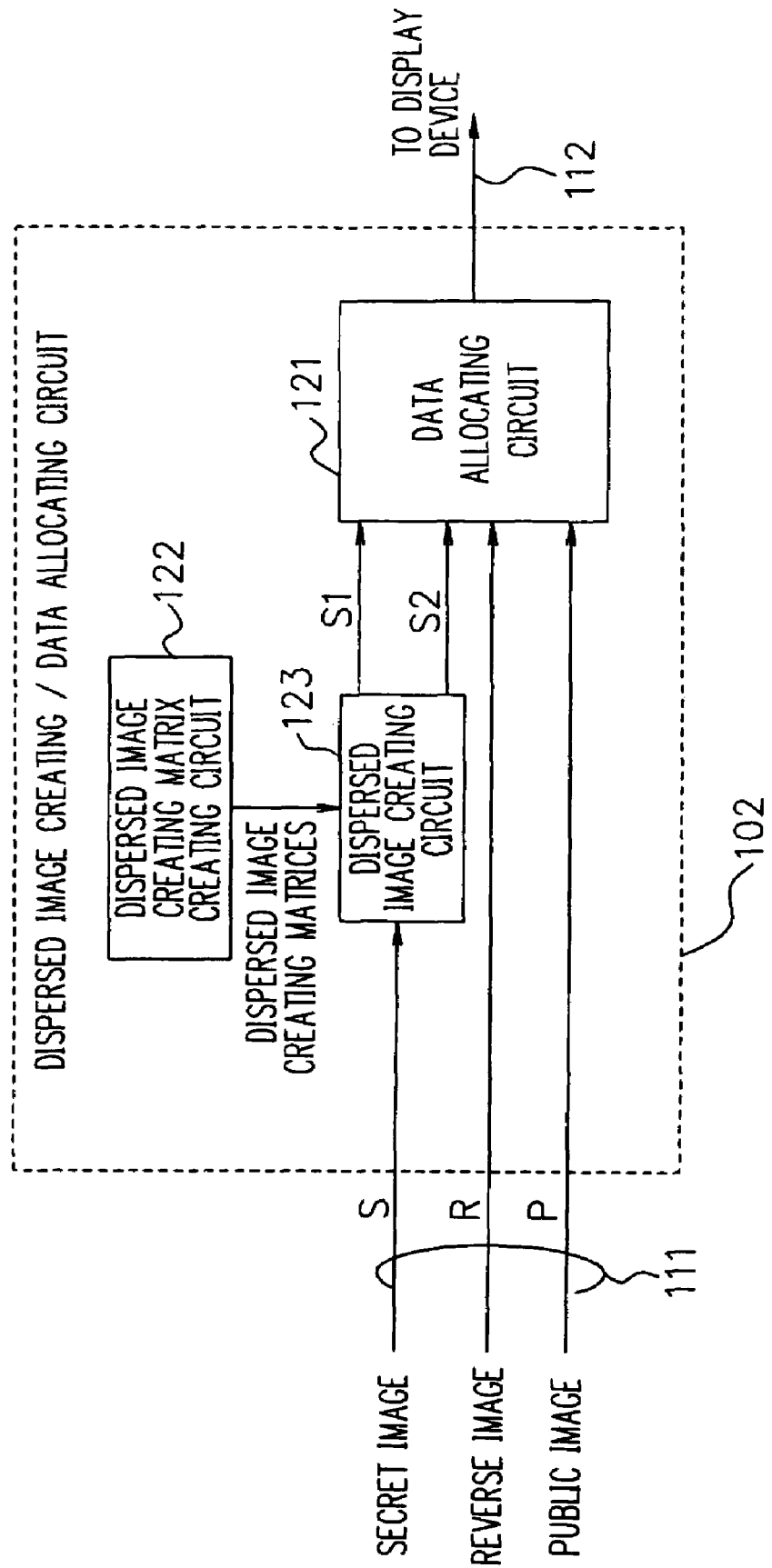
FIG. 8 is a diagram of a configuration of a dispersed image creating/data allocating circuit according to the first exemplary embodiment.
Figure 11:
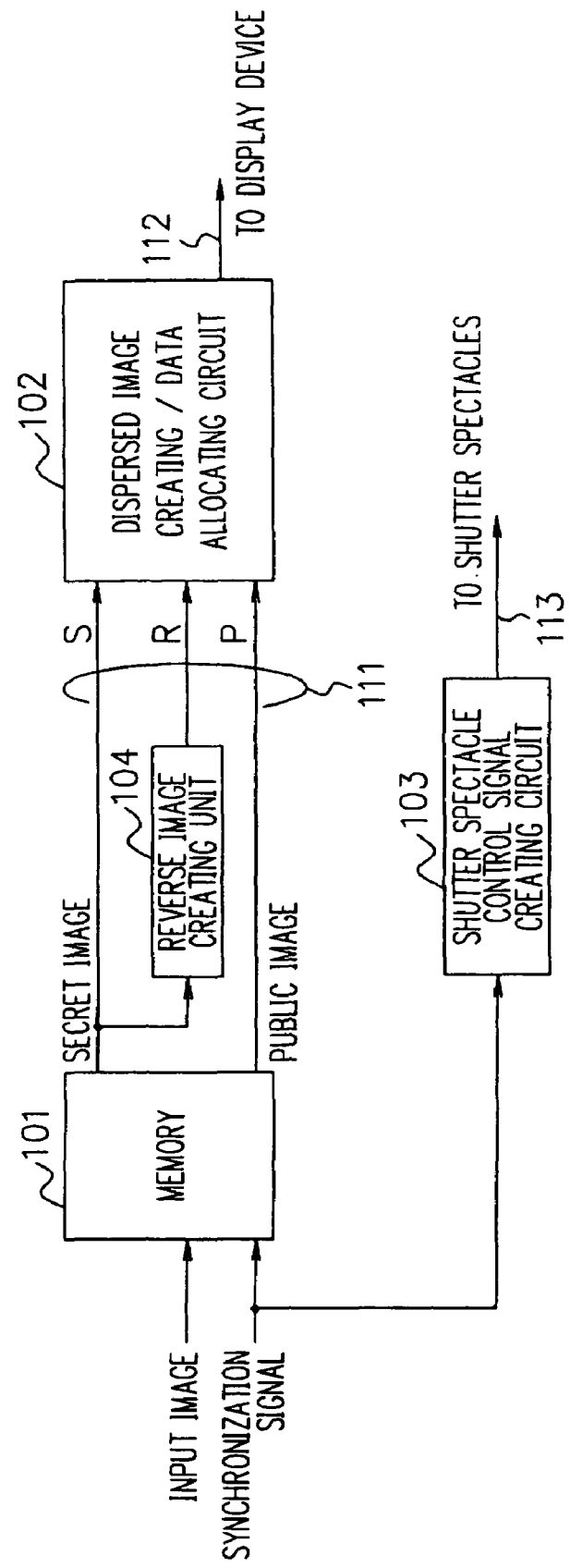
FIG. 11 is a diagram of a configuration of the image processing apparatus according to a second exemplary embodiment preferably implementing the present invention.
Figure 12:
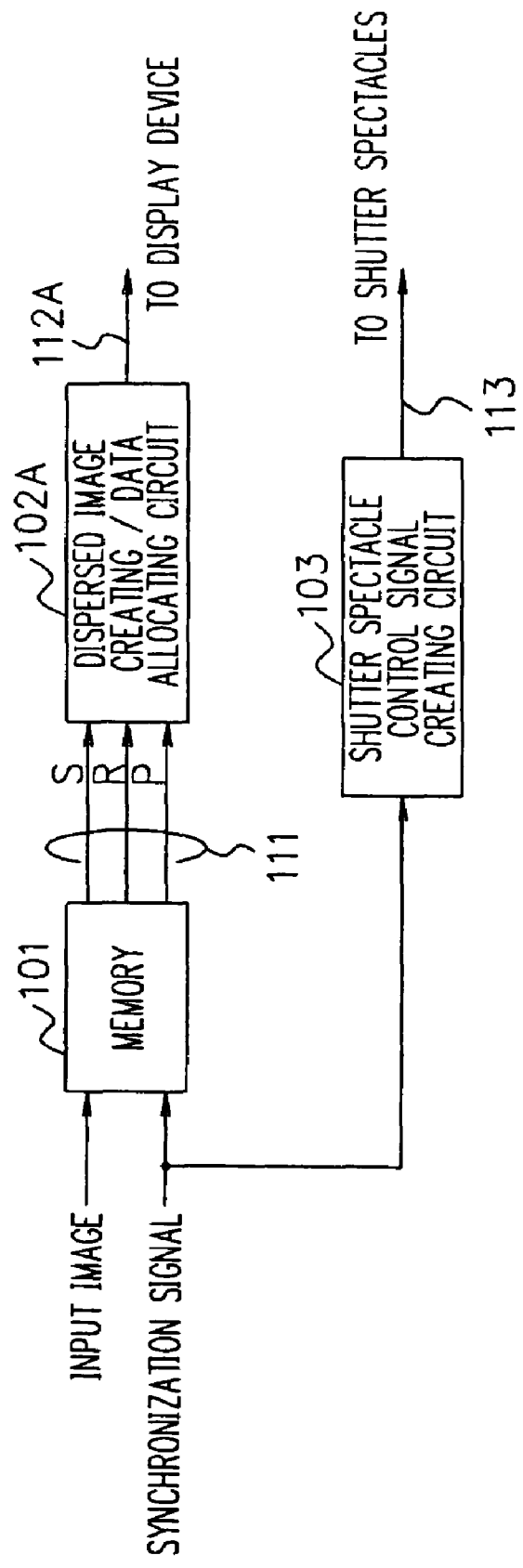
FIG. 12 is a diagram of a configuration of the image processing apparatus according to a third exemplary embodiment preferably implementing the present invention.
Figure 13:
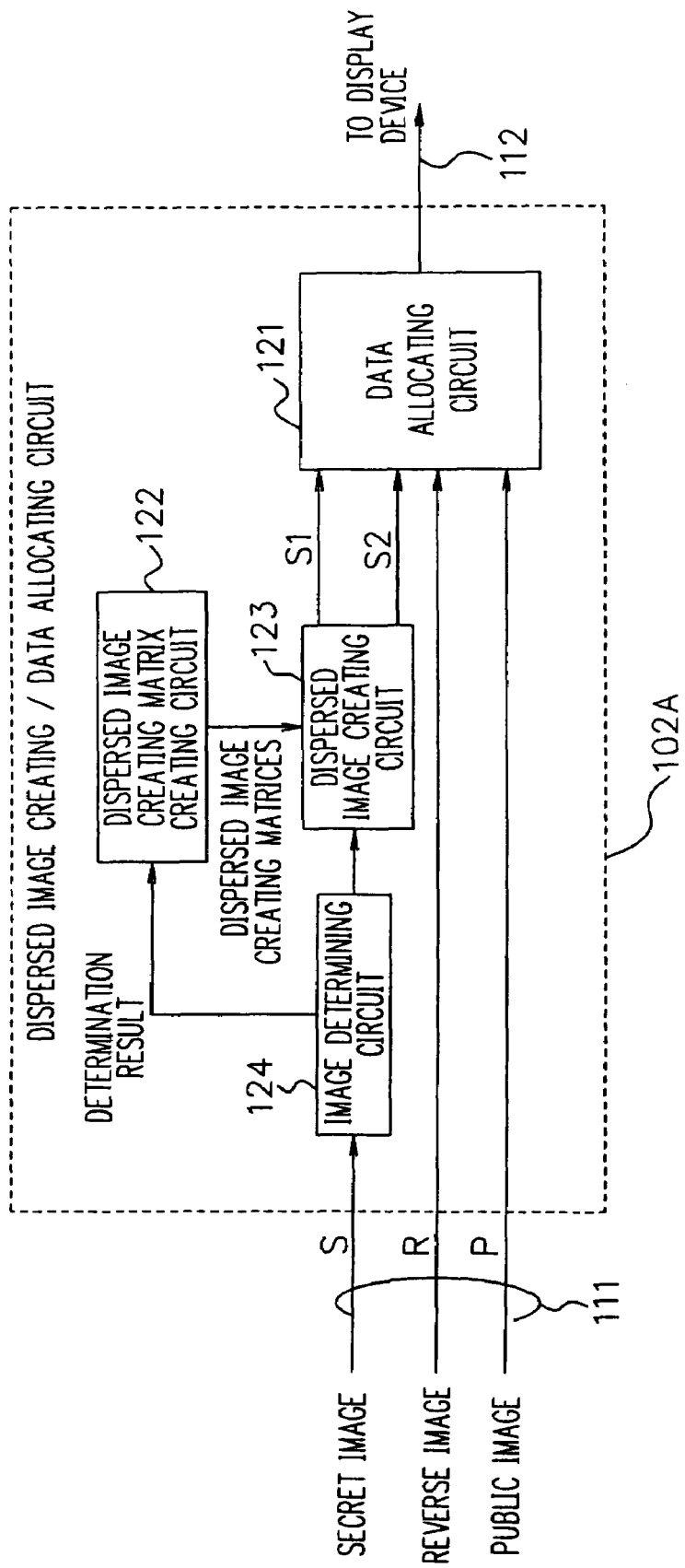
FIG. 13 is a diagram of a configuration of the dispersed image creating/data allocating circuit according the third exemplary embodiment.
Figure 14:
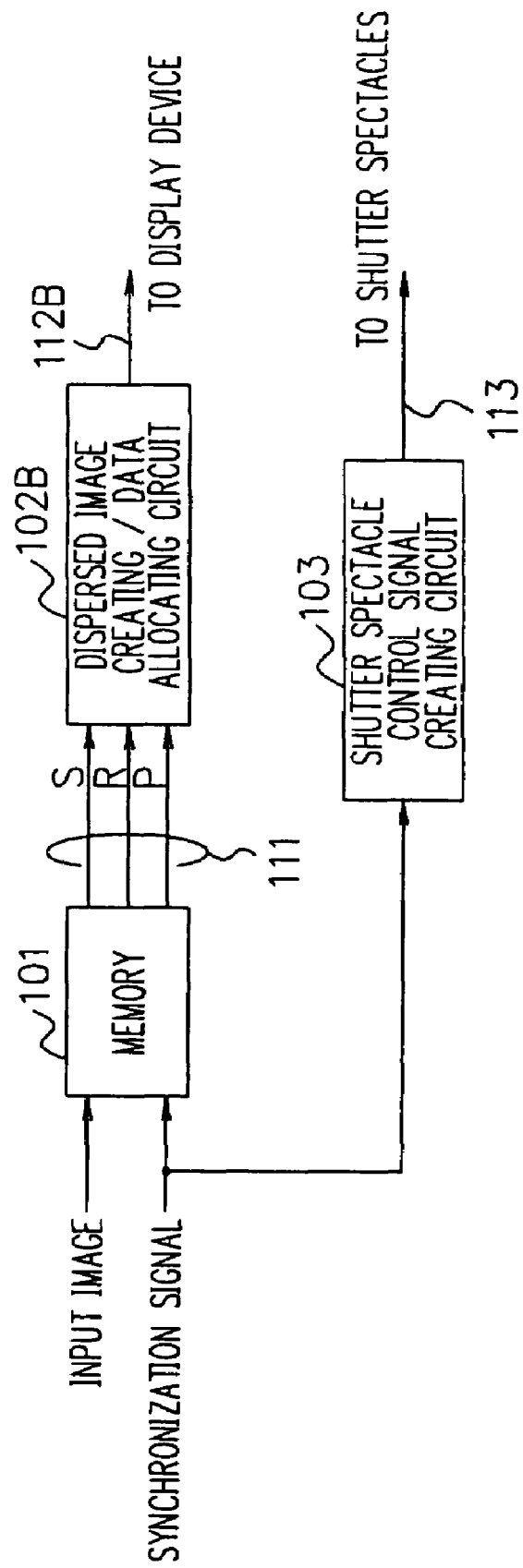
FIG. 14 is a diagram of a configuration of the image processing apparatus according to a fourth exemplary embodiment preferably implementing the present invention.
Figure 15:
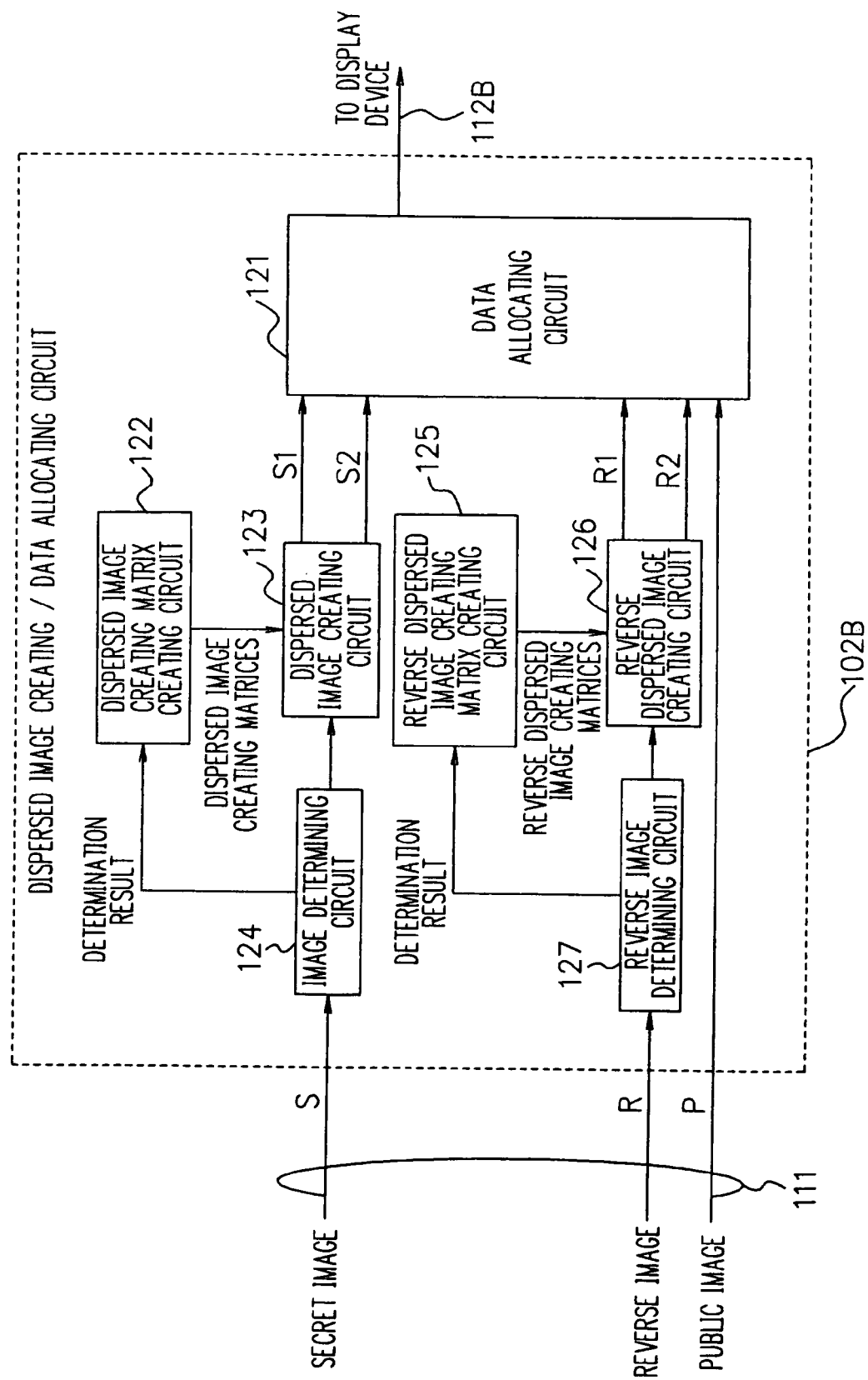
FIG. 15 is a diagram of a configuration of the dispersed image creating/data allocating circuit according to the fourth exemplary embodiment.
Figure 16:
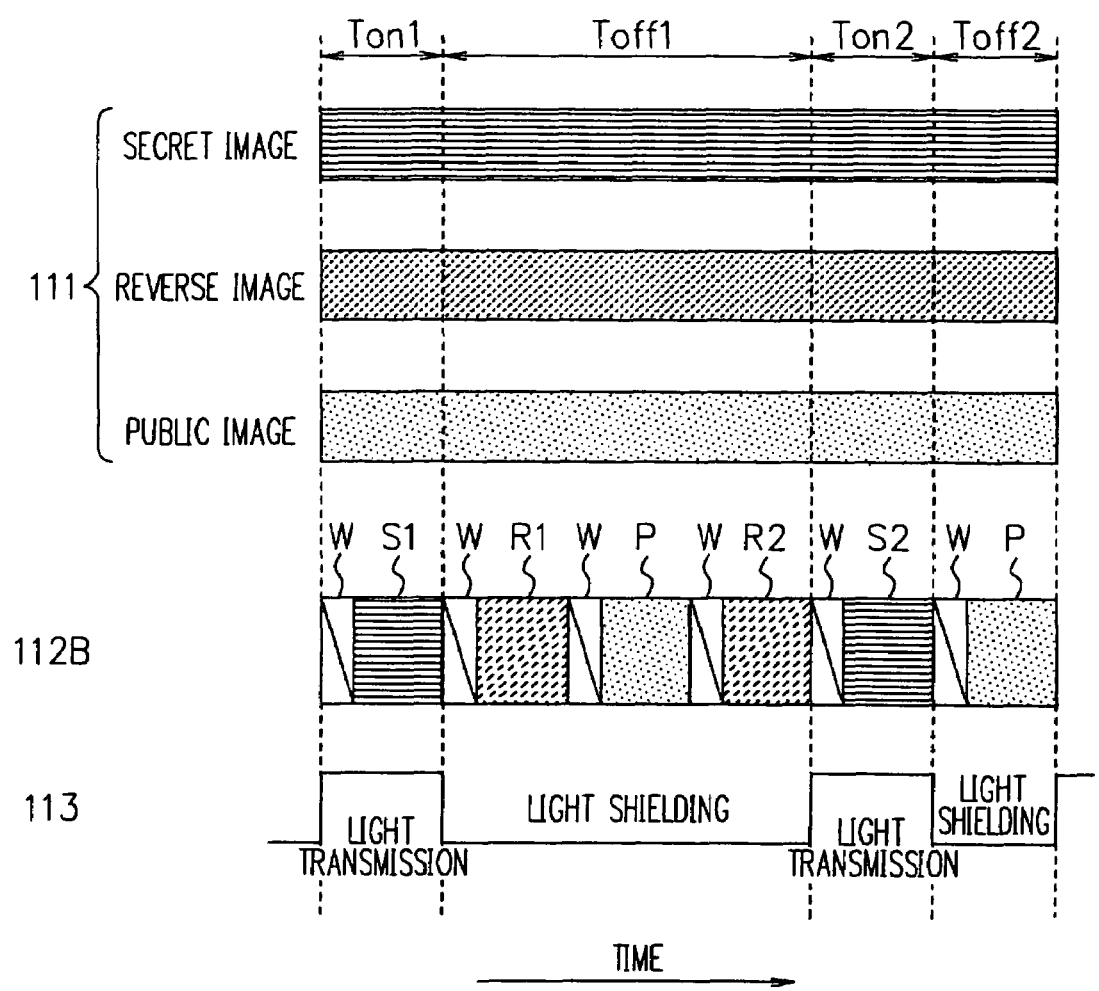
FIG. 16 is a diagram of an example of a timing chart of the control signals of the image processing apparatus according to the fourth exemplary embodiment.
Figure 17:
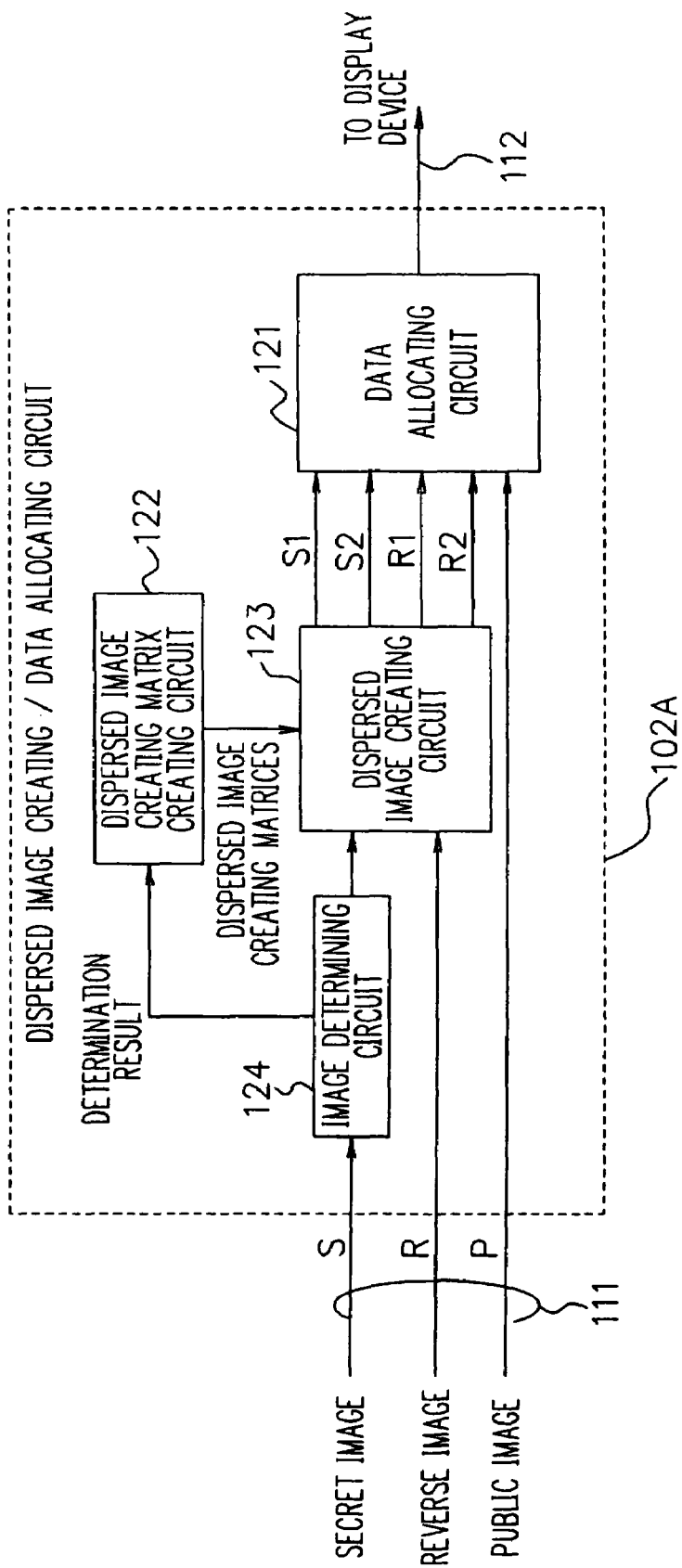
FIG. 17 is a diagram of another configuration of the dispersed image creating/data allocating circuit according to the fourth exemplary embodiment.
Figure 18:
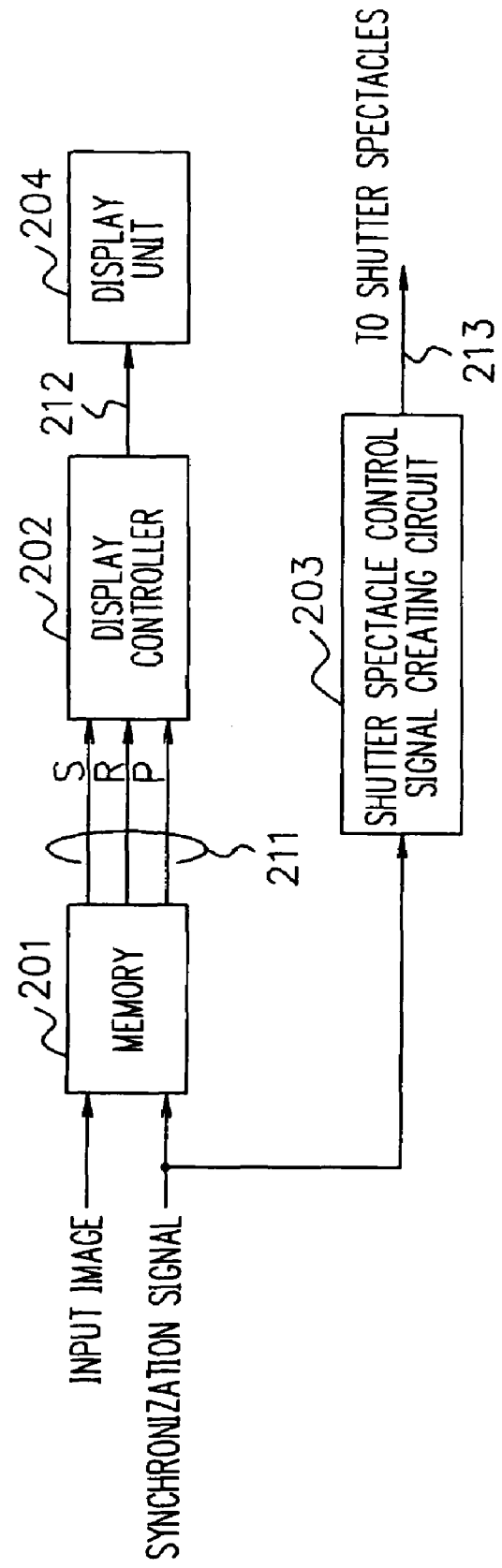
FIG. 18 is a diagram of a configuration of a display device according to a fifth exemplary embodiment preferably implementing the present invention.
Figure 19:
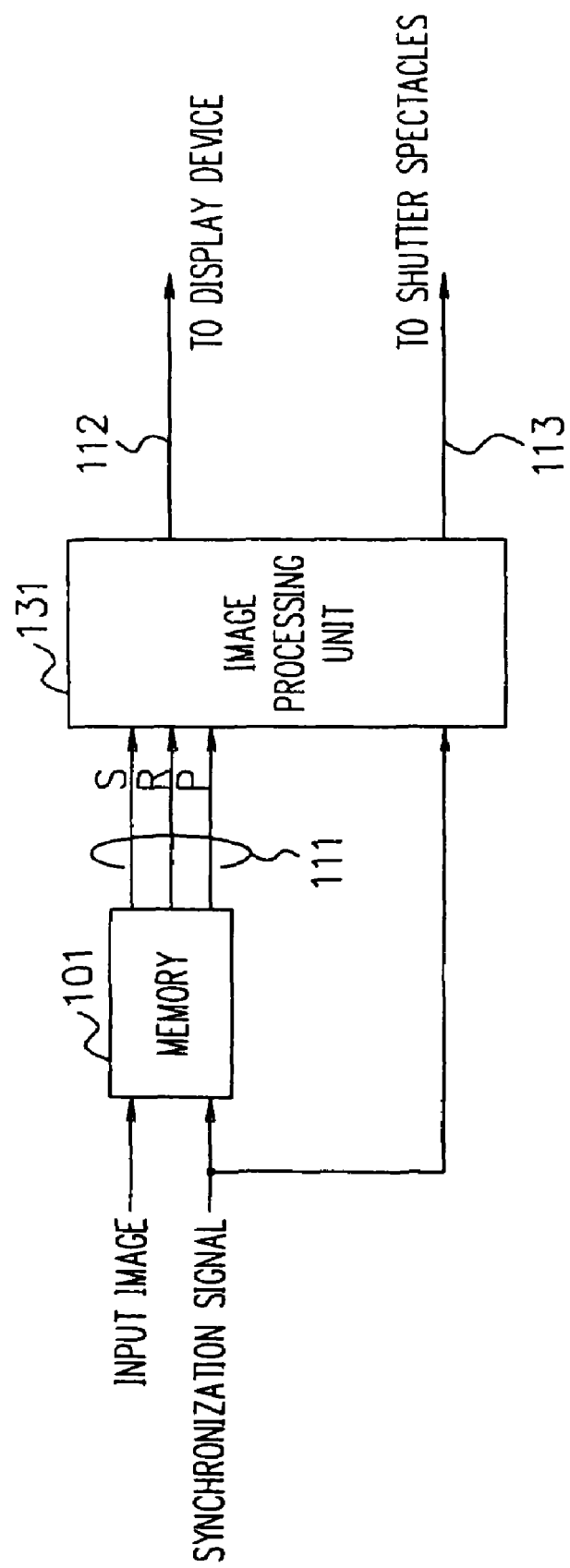
FIG. 19 is a diagram of a configuration of an apparatus that executes an image processing method according to a sixth exemplary embodiment preferably implementing the present invention.
Figure 20:
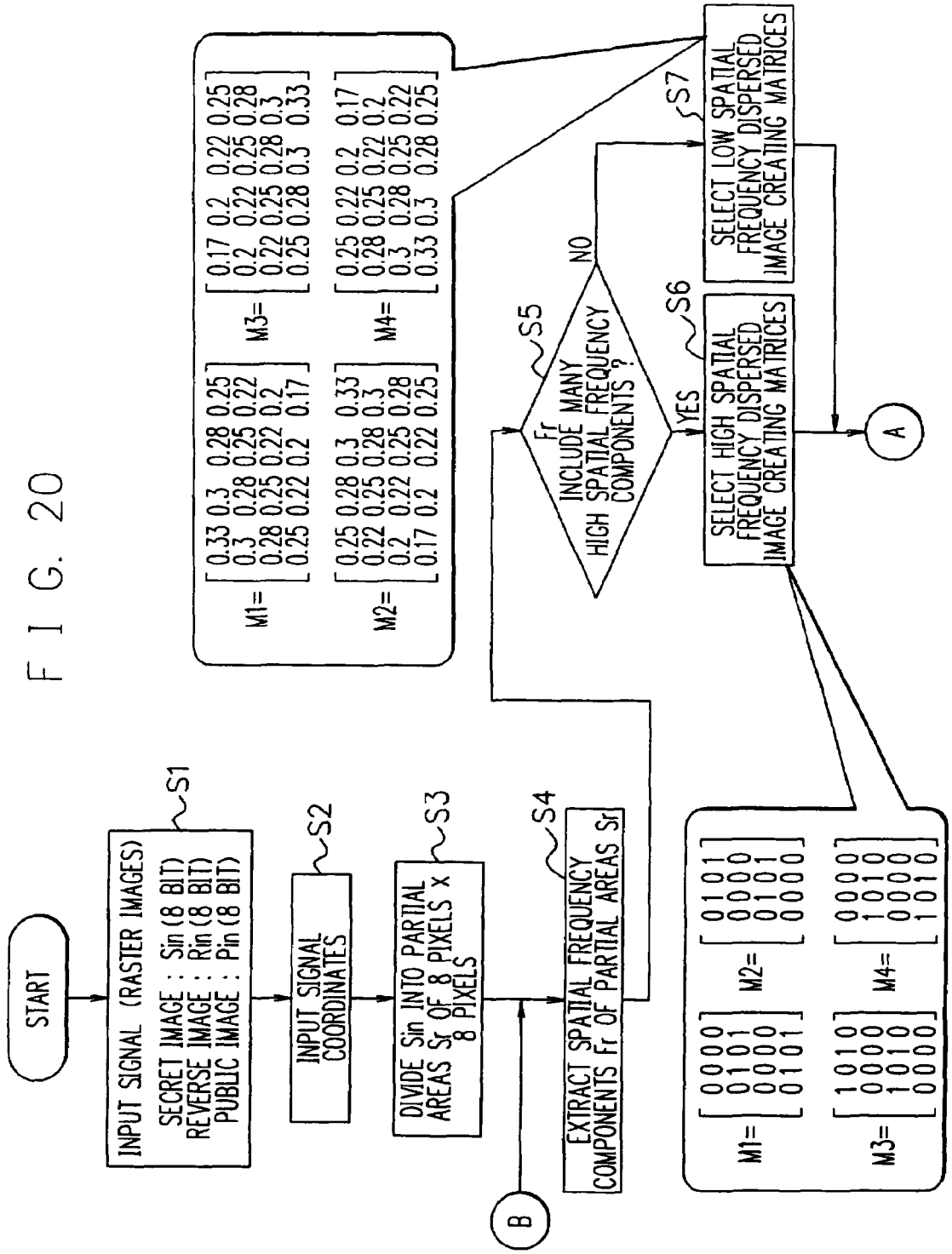
FIG. 20 is a flow chart showing a flow of a process of the image processing method according to the sixth exemplary embodiment.
Figure 21:
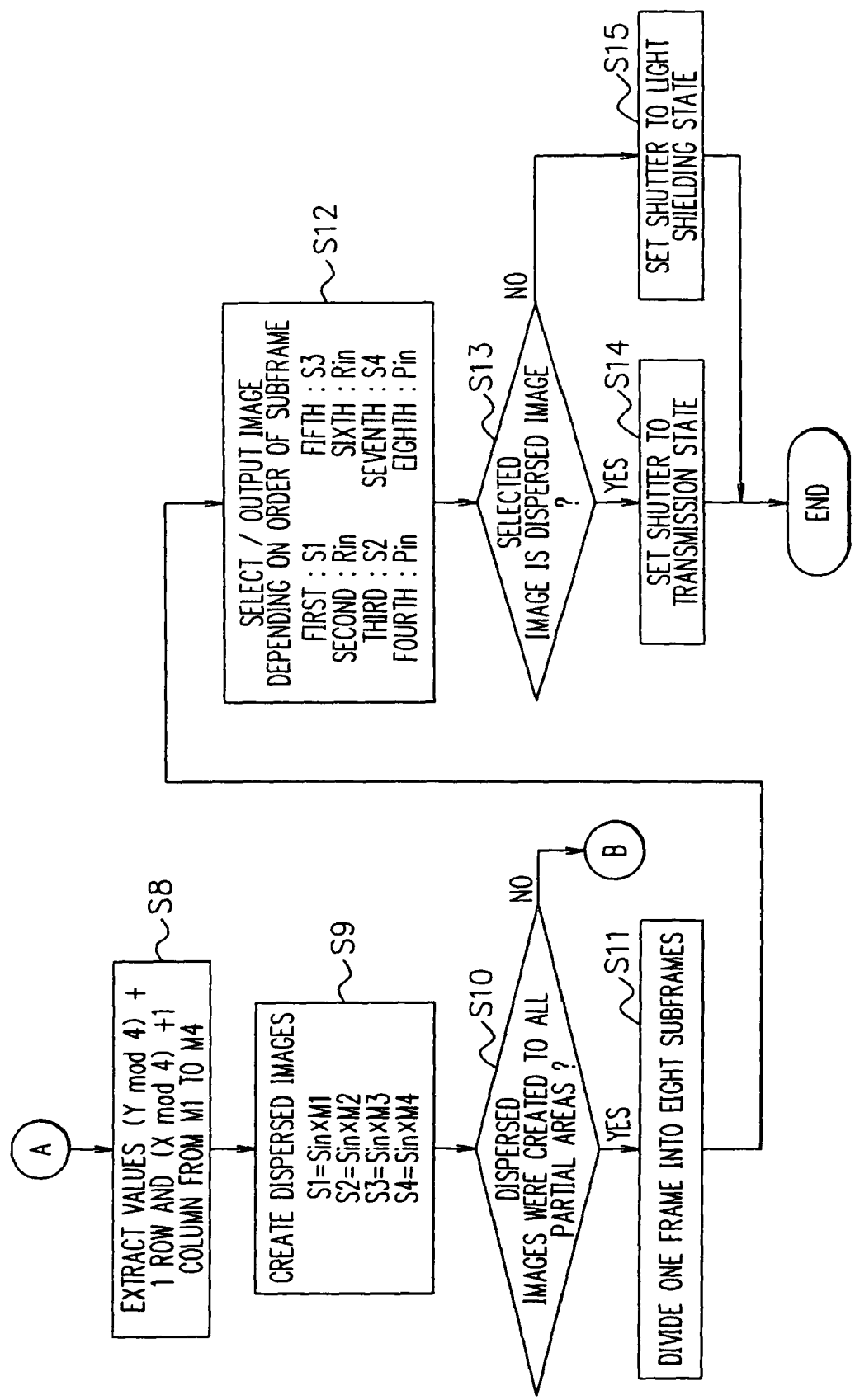
FIG. 21 is a flow chart showing the flow of the process of the image processing method according to the sixth exemplary embodiment.
Figure 22:
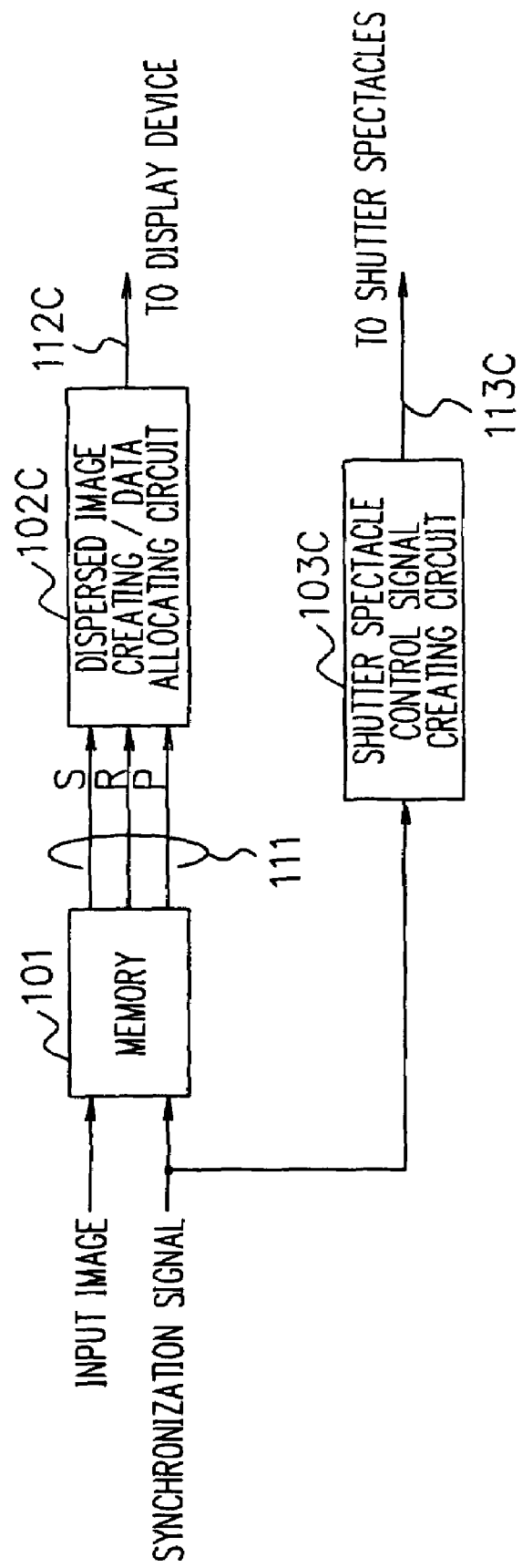
FIG. 22 is a diagram of a configuration of the image processing apparatus according to a seventh exemplary embodiment preferably implementing the present invention.
Figure 23:
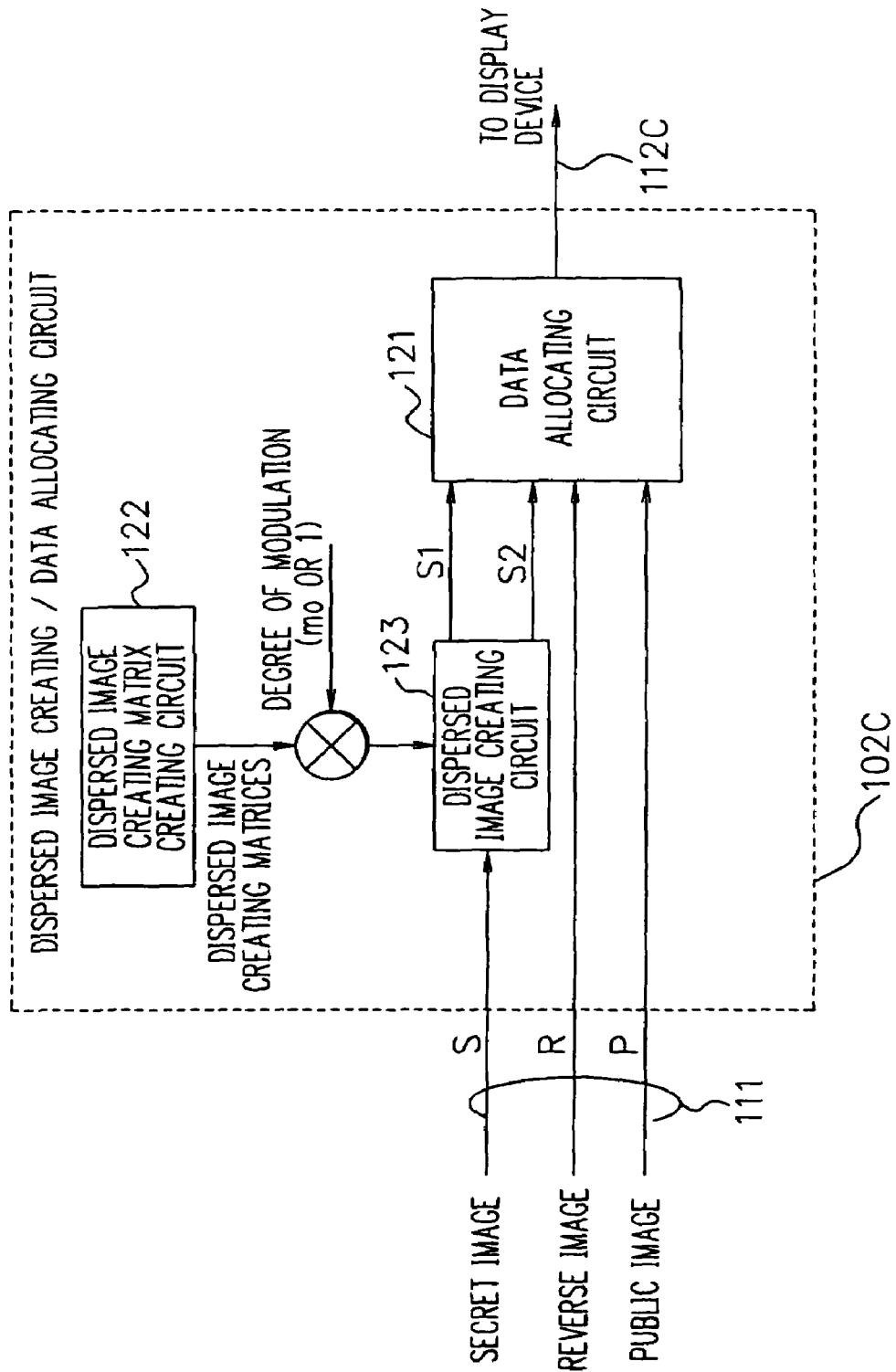
FIG. 23 is a diagram of a configuration of the dispersed image creating/data allocating circuit according to the seventh exemplary embodiment.
Figure 24:
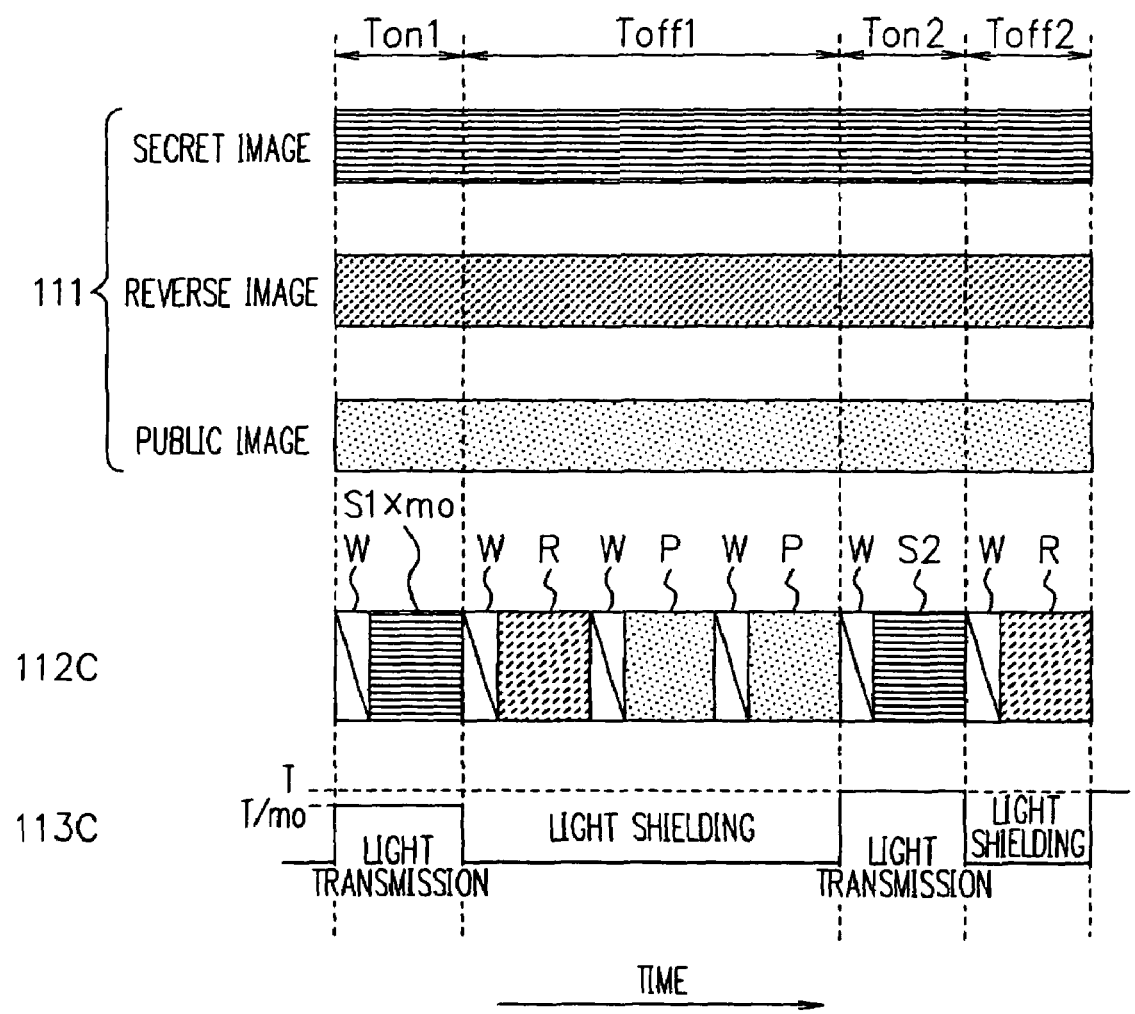
FIG. 24 is a diagram of an example of a timing chart of the control signals of the image processing apparatus according to the seventh exemplary embodiment.

101, 201 memory
102, 102A, 102B, 102C dispersed image creating/data allocating circuit
103, 203 shutter spectacle control signal creating circuit
104 reverse image creating unit
111 output signal (memory)
112 output signal (dispersed image creating/data allocating circuit)
113 output signal (shutter spectacle control signal creating circuit)
121 data allocating circuit
122 dispersed image creating matrix creating circuit
123 dispersed image creating circuit
124 image determining circuit
125 reverse dispersed image creating matrix creating circuit
126 reverse dispersed image creating circuit
127 reverse image determining circuit
131 image processing unit
202 display controller

The invention claimed is:

1. An image processing apparatus that sequentially outputs image signals in accordance with each of at least two types of images, the image processing apparatus comprising:
    a memory that stores the image data of the inputted at least two types of images, a first image and a second image included in the at least two types of images being in a relationship of forming image data of an image not correlated with the first image when luminance values of image data respectively are added pixel by pixel;
    a unit that creates image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively; and
    a shutter controlling unit that outputs a shutter control signal for setting a light shutter to a light transmission state only in a time for outputting image signals in accordance with the image data of the first dispersed images.

2. An image processing apparatus that sequentially outputs image signals in accordance with each of at least two types of images, the image processing apparatus comprising:
    a memory that stores the image data of the inputted at least two types of images;
    a unit that creates image data of a second image that forms image data of an image not correlated with a first image when the luminance values are added pixel by pixel based on the image data of the first image included in the at least two types of images stored in the memory;
    a unit that creates image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively; and
    a shutter controlling unit that outputs a shutter control signal for setting a light shutter to a light transmission state only in a time for outputting image signals in accordance with the image data of the first dispersed images.

3. An image processing apparatus that sequentially outputs image signals in accordance with each of at least two types of images, the image processing apparatus comprising:
    a memory that stores the image data of the inputted at least two types of images, a first image and a second image included in the at least two types of images being in a relationship of forming image data of an image not correlated with the first image when luminance values of image data respectively are added pixel by pixel;

a unit that creates image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively;

a modulating unit that multiplies the luminance values by a degree of modulation pixel by pixel, the degree of modulation being one or greater, in the image data of the plurality of first dispersed images; and a shutter controlling unit that sets a transmittance of a light shutter to a value in which a maximum transmittance is multiplied by an inverse of the degree of modulation in a time for outputting image signals in accordance with the modulated image data of the first dispersed images and for outputting a shutter control signal to set a light shielding state in a time for outputting image signals in accordance with image data of the images other than the first dispersed images.

4. The image processing apparatus according to claim 1, wherein
the first dispersed images include many high spatial frequency components if created based on areas with many high spatial frequency components in the first image and include many low spatial frequency components if created based on areas with many low spatial frequency components in the first image.

5. The image processing apparatus according to claim 1, comprising:
a unit that creates image data of a plurality of second dispersed images that form the second image when luminance values are added pixel by pixel based on the image data of the second image,
wherein the image processing apparatus
allocates luminance values to arbitrary pixels of the plurality of second dispersed images such that grayscale values of two or more second dispersed images are not grayscales expressing black; and
outputs image signals in accordance with image data of the second dispersed images instead of the image signals in accordance with the image data of the second image.

6. The image processing apparatus according to claim 5, wherein
the image processing apparatus outputs an image signal of an image other than the second dispersed images between an image signal in accordance with any of the image data of the second dispersed images and an image signal in accordance with any other image data of the second dispersed image signal.

7. The image processing apparatus according to claim 1, wherein
the image processing apparatus outputs an image signal in accordance with image data of a third image while outputting the shutter control signal for setting the light shutter to the light shielding state.

8. The image processing apparatus according to claim 1, wherein
the image processing apparatus outputs an image signal of an image other than the first dispersed images between an image signal in accordance with any of the image data of the first dispersed images and an image signal in accordance with any other image data of the first dispersed image signal.

9. An image processing method for sequentially outputting image signals in accordance with each of at least two types of images, wherein a first image and a second image included in the at least two types of images being in a relationship of forming image data of an image not correlated with the first image when luminance values of image data respectively are added pixel by pixel, the image processing method comprising:
creating image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively; and
outputting a shutter control signal for setting a light shutter to a light transmission state only in a time for outputting image signals in accordance with the image data of the first dispersed images.

10. An image processing method for sequentially outputting image signals in accordance with each of at least two types of images, the image processing method comprising:
storing the image data of the inputted at least two types of images in a memory;
creating image data of a second image that forms image data of an image not correlated with a first image when the luminance values are added pixel by pixel based on the image data of the first image included in the at least two types of images stored in the memory;
creating image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively; and
outputting a shutter control signal for setting a light shutter to a light transmission state only in a time for outputting image signals in accordance with the image data of the first dispersed images.

11. An image processing method for sequentially outputting image signals in accordance with each of at least two types of images, the image processing method comprising:
storing the image data of the inputted at least two types of images in a memory, a first image and a second image included in the at least two types of images being in a relationship of forming image data of an image not correlated with the first image when luminance values of image data respectively are added pixel by pixel;
creating image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively;
multiplying the luminance values by a degree of modulation pixel by pixel, the degree of modulation being one or greater, in the image data of the plurality of first dispersed images; and
setting a transmittance of a light shutter to a value in which a maximum transmittance is multiplied by an inverse of the degree of modulation in a time for outputting image signals in accordance with the modulated image data of the first dispersed images and outputting a shutter control signal to set a light shielding state in a time for outputting image signals in accordance with image data of the images other than the first dispersed images.

12. The image processing method according to claim 9, wherein
the first dispersed images include many high spatial frequency components if created based on areas with many high spatial frequency components in the first image and include many low spatial frequency components if created based on areas with many low spatial frequency components in the first image.

13. The image processing method according to claim 9, comprising:
creating image data of a plurality of second dispersed images that form the second image when luminance values are added pixel by pixel based on the image data of the second image;
allocating luminance values to arbitrary pixels of the plurality of second dispersed images such that grayscale values of two or more second dispersed images are not grayscales expressing black; and
outputting image signals in accordance with image data of the second dispersed images instead of the image signals in accordance with the image data of the second image.

14. The image processing method according to claim 13, comprising:
outputting an image signal of an image other than the second dispersed images between an image signal in accordance with any of the image data of the second dispersed images and an image signal in accordance with any other image data of the second dispersed image signal.

15. The image processing method according to claim 9, comprising:
outputting an image signal in accordance with image data of a third image while outputting the shutter control signal for setting the light shutter to the light shielding state.

16. The image processing method according to claim 9, comprising:
outputting an image signal of an image other than the first dispersed images between an image signal in accordance with any of the image data of the first dispersed images and an image signal in accordance with any other image data of the first dispersed image signal.

17. A computer-readable medium storing a program a image processing program, causing a substantial computer to execute the image processing method according to claim 9.

18. A display device that sequentially displays at least two types of images, the display device comprising:
a memory that stores the image data of the inputted at least two types of images, a first image and a second image included in the at least two types of images being in a relationship of forming image data of an image not correlated with the first image when luminance values of image data respectively are added pixel by pixel;
a unit that creates image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively; and
a shutter controlling unit that outputs a shutter control signal for setting a light shutter to a light transmission state only in a time for displaying images in accordance with the image data of the first dispersed images.

19. A display device that sequentially displays at least two types of images, the display device comprising:
a memory that stores the image data of the inputted at least two types of images;
a unit that creates image data of a second image that forms image data of an image not correlated with a first image when the luminance values are added pixel by pixel based on the image data of the first image included in the at least two types of images stored in the memory;
a unit that creates image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively; and
a shutter controlling unit that outputs a shutter control signal for setting a light shutter to a light transmission state only in a time for displaying images in accordance with the image data of the first dispersed images.

20. A display device that sequentially displays at least two types of images, the display device comprising:
a memory that stores the image data of the inputted at least two types of images, a first image and a second image included in the at least two types of images being in a relationship of forming image data of an image not correlated with the first image when luminance values of image data respectively are added pixel by pixel;
a unit that creates image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively;
a modulating unit that multiplies the luminance values by a degree of modulation pixel by pixel, the degree of modulation being one or greater, in the image data of the plurality of first dispersed images; and
a shutter controlling unit that sets a transmittance of a light shutter to a value in which a maximum transmittance is multiplied by an inverse of the degree of modulation in a time for displaying images in accordance with the modulated image data of the first dispersed images and for outputting a shutter control signal to set a light shielding state in a time for displaying images in accordance with image data of the images other than the first dispersed images.

21. The display device according to claim 18, wherein
the first dispersed images include many high spatial frequency components if created based on areas with many high spatial frequency components in the first image and include many low spatial frequency components if created based on areas with many low spatial frequency components in the first image.

22. The display device according to claim 18, comprising:
a unit that creates image data of a plurality of second dispersed images that form the second image when luminance values are added pixel by pixel based on the image data of the second image;
allocating luminance values to arbitrary pixels of the plurality of second dispersed images such that grayscale values of two or more second dispersed images are not grayscales expressing black; and displaying images in accordance with image data of the second dispersed images instead of the image in accordance with the image data of the second image.

23. The display device according to claim 22, comprising: displaying an image other than the second dispersed images between an image in accordance with any of the image data of the second dispersed images and an image in accordance with any other image data of the second dispersed image signal.

24. The display device according to claim 18, comprising: displaying an image in accordance with image data of a third image while outputting the shutter control signal for setting the light shutter to the light shielding state.

25. The display device according to claim 18, comprising: displaying an image other than the first dispersed images between an image in accordance with any of the image data of the first dispersed images and an image in accordance with any other image data of the first dispersed images.

26. An image display system using the display device according to claim 18, the image display system comprising: a light shutter that is set to a light transmission state or a light shielding state in accordance with the shutter control signal.

27. The image processing apparatus according to claim 2, wherein
the first dispersed images include many high spatial frequency components if created based on areas with many high spatial frequency components in the first image and include many low spatial frequency components if created based on areas with many low spatial frequency components in the first image.

28. The image processing apparatus according to claim 3, wherein
the first dispersed images include many high spatial frequency components if created based on areas with many high spatial frequency components in the first image and include many low spatial frequency components if created based on areas with many low spatial frequency components in the first image.

29. The image processing apparatus according to claim 2, comprising:
a unit that creates image data of a plurality of second dispersed images that form the second image when luminance values are added pixel by pixel based on the image data of the second image, wherein the image processing apparatus;
allocates luminance values to arbitrary pixels of the plurality of second dispersed images such that grayscale values of two or more second dispersed images are not grayscales expressing black; and
outputs image signals in accordance with image data of the second dispersed images instead of the image signals in accordance with the image data of the second image.

30. The image processing apparatus according to claim 3, comprising:
a unit that creates image data of a plurality of second dispersed images that form the second image when luminance values are added pixel by pixel based on the image data of the second image, wherein the image processing apparatus
allocates luminance values to arbitrary pixels of the plurality of second dispersed images such that grayscale values of two or more second dispersed images are not grayscales expressing black; and
outputs image signals in accordance with image data of the second dispersed images instead of the image signals in accordance with the image data of the second image.

31. The image processing apparatus according to claim 29, wherein
the image processing apparatus outputs an image signal of an image other than the second dispersed images between an image signal in accordance with any of the image data of the second dispersed images and an image signal in accordance with any other image data of the second dispersed image signal.

32. The image processing apparatus according to claim 30, wherein
the image processing apparatus outputs an image signal of an image other than the second dispersed images between an image signal in accordance with any of the image data of the second dispersed images and an image signal in accordance with any other image data of the second dispersed image signal.

33. The image processing apparatus according to claim 2, wherein
the image processing apparatus outputs an image signal in accordance with image data of a third image while outputting the shutter control signal for setting the light shutter to the light shielding state.

34. The image processing apparatus according to claim 3, wherein
the image processing apparatus outputs an image signal in accordance with image data of a third image while outputting the shutter control signal for setting the light shutter to the light shielding state.

35. The image processing apparatus according to claim 2, wherein
the image processing apparatus outputs an image signal of an image other than the first dispersed images between an image signal in accordance with any of the image data of the first dispersed images and an image signal in accordance with any other image data of the first dispersed image signal.

36. The image processing apparatus according to claim 3, wherein
the image processing apparatus outputs an image signal of an image other than the first dispersed images between an image signal in accordance with any of the image data of the first dispersed images and an image signal in accordance with any other image data of the first dispersed image signal.

37. The image processing method according to claim 10, wherein
the first dispersed images include many high spatial frequency components if created based on areas with many high spatial frequency components in the first image and include many low spatial frequency components if created based on areas with many low spatial frequency components in the first image.

38. The image processing method according to claim 11, wherein
the first dispersed images include many high spatial frequency components if created based on areas with many high spatial frequency components in the first image and include many low spatial frequency components if created based on areas with many low spatial frequency components in the first image.

39. The image processing method according to claim 10, comprising:
- creating image data of a plurality of second dispersed images that form the second image when luminance values are added pixel by pixel based on the image data of the second image;
- allocating luminance values to arbitrary pixels of the plurality of second dispersed images such that grayscale values of two or more second dispersed images are not grayscales expressing black; and
- outputting image signals in accordance with image data of the second dispersed images instead of the image signals in accordance with the image data of the second image.

40. The image processing method according to claim 11, comprising:
- creating image data of a plurality of second dispersed images that form the second image when luminance values are added pixel by pixel based on the image data of the second image;
- allocating luminance values to arbitrary pixels of the plurality of second dispersed images such that grayscale values of two or more second dispersed images are not grayscales expressing black; and
- outputting image signals in accordance with image data of the second dispersed images instead of the image signals in accordance with the image data of the second image.

41. The image processing method according to claim 39, comprising:
- outputting an image signal of an image other than the second dispersed images between an image signal in accordance with any of the image data of the second dispersed images and an image signal in accordance with any other image data of the second dispersed image signal.

42. The image processing method according to claim 40, comprising:
- outputting an image signal of an image other than the second dispersed images between an image signal in accordance with any of the image data of the second dispersed images and an image signal in accordance with any other image data of the second dispersed image signal.

43. The image processing method according to claim 10, comprising:
- outputting an image signal in accordance with image data of a third image while outputting the shutter control signal for setting the light shutter to the light shielding state.

44. The image processing method according to claim 11, comprising:
- outputting an image signal in accordance with image data of a third image while outputting the shutter control signal for setting the light shutter to the light shielding state.

45. The image processing method according to claim 10, comprising:
- outputting an image signal of an image other than the first dispersed images between an image signal in accordance with any of the image data of the first dispersed images and an image signal in accordance with any other image data of the first dispersed image signal.

46. The image processing method according to claim 11, comprising:
- outputting an image signal of an image other than the first dispersed images between an image signal in accordance with any of the image data of the first dispersed images and an image signal in accordance with any other image data of the first dispersed image signal.

47. A computer-readable medium storing a program a image processing program, causing a substantial computer to execute the image processing method according to claim 10.

48. A computer-readable medium storing a program a image processing program, causing a substantial computer to execute the image processing method according to claim 11.

49. The display device according to claim 19, wherein
- the first dispersed images include many high spatial frequency components if created based on areas with many high spatial frequency components in the first image and include many low spatial frequency components if created based on areas with many low spatial frequency components in the first image.

50. The display device according to claim 20, wherein
- the first dispersed images include many high spatial frequency components if created based on areas with many high spatial frequency components in the first image and include many low spatial frequency components if created based on areas with many low spatial frequency components in the first image.

51. The display device according to claim 19, comprising:
- a unit that creates image data of a plurality of second dispersed images that form the second image when luminance values are added pixel by pixel based on the image data of the second image;
- allocating luminance values to arbitrary pixels of the plurality of second dispersed images such that grayscale values of two or more second dispersed images are not grayscales expressing black; and
- displaying images in accordance with image data of the second dispersed images instead of the image in accordance with the image data of the second image.

52. The display device according to claim 20, comprising:
- a unit that creates image data of a plurality of second dispersed images that form the second image when luminance values are added pixel by pixel based on the image data of the second image;
- allocating luminance values to arbitrary pixels of the plurality of second dispersed images such that grayscale values of two or more second dispersed images are not grayscales expressing black; and
- displaying images in accordance with image data of the second dispersed images instead of the image in accordance with the image data of the second image.

53. The display device according to claim 51, comprising:
- displaying an image other than the second dispersed images between an image in accordance with any of the image data of the second dispersed images and an image in accordance with any other image data of the second dispersed image signal.

54. The display device according to claim 52, comprising:
- displaying an image other than the second dispersed images between an image in accordance with any of the image data of the second dispersed images and an image in accordance with any other image data of the second dispersed image signal.

55. The display device according to claim 19, comprising:
- displaying an image in accordance with image data of a third image while outputting the shutter control signal for setting the light shutter to the light shielding state.

56. The display device according to claim 20, comprising:
- displaying an image in accordance with image data of a third image while outputting the shutter control signal for setting the light shutter to the light shielding state.

57. The display device according to claim 19, comprising:
displaying an image other than the first dispersed images between an image in accordance with any of the image data of the first dispersed images and an image in accordance with any other image data of the first dispersed images.

58. The display device according to claim 20, comprising:
displaying an image other than the first dispersed images between an image in accordance with any of the image data of the first dispersed images and an image in accordance with any other image data of the first dispersed images.

59. An image display system using the display device according to claim 19, the image display system comprising:
a light shutter that is set to a light transmission state or a light shielding state in accordance with the shutter control signal.

60. An image display system using the display device according to claim 20, the image display system comprising:
a light shutter that is set to a light transmission state or a light shielding state in accordance with the shutter control signal.

61. An image processing apparatus that sequentially outputs image signals in accordance with each of at least two types of images, the image processing apparatus comprising:
a memory that stores the image data of the inputted at least two types of images, a first image and a second image included in the at least two types of images being in a relationship of forming image data of an image not correlated with the first image when luminance values of image data respectively are added pixel by pixel;
means for creating image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively; and
shutter controlling means for outputting a shutter control signal for setting a light shutter to a light transmission state only in a time for outputting image signals in accordance with the image data of the first dispersed images.

62. An image processing apparatus that sequentially outputs image signals in accordance with each of at least two types of images, the image processing apparatus comprising:
a memory that stores the image data of the inputted at least two types of images;
means for creating image data of a second image that forms image data of an image not correlated with a first image when the luminance values are added pixel by pixel based on the image data of the first image included in the at least two types of images stored in the memory;
means for creating image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively; and
shutter controlling means for outputting a shutter control signal for setting a light shutter to a light transmission state only in a time for outputting image signals in accordance with the image data of the first dispersed images.

63. An image processing apparatus that sequentially outputs image signals in accordance with each of at least two types of images, the image processing apparatus comprising:
a memory that stores the image data of the inputted at least two types of images, a first image and a second image included in the at least two types of images being in a relationship of forming image data of an image not correlated with the first image when luminance values of image data respectively are added pixel by pixel;
means for creating image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively;
modulating means for multiplying the luminance values by a degree of modulation pixel by pixel, the degree of modulation being one or greater, in the image data of the plurality of first dispersed images; and
shutter controlling means for setting a transmittance of a light shutter to a value in which a maximum transmittance is multiplied by an inverse of the degree of modulation in a time for outputting image signals in accordance with the modulated image data of the first dispersed images and for outputting a shutter control signal to set a light shielding state in a time for outputting image signals in accordance with image data of the images other than the first dispersed images.

64. A display device that sequentially displays at least two types of images, the display device comprising:
a memory that stores the image data of the inputted at least two types of images, a first image and a second image included in the at least two types of images being in a relationship of forming image data of an image not correlated with the first image when luminance values of image data respectively are added pixel by pixel;
means for creating image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively; and
shutter controlling means for outputting a shutter control signal for setting a light shutter to a light transmission state only in a time for displaying images in accordance with the image data of the first dispersed images.

65. A display device that sequentially displays at least two types of images, the display device comprising:
a memory that stores the image data of the inputted at least two types of images;
means for creating image data of a second image that forms image data of an image not correlated with a first image when the luminance values are added pixel by pixel based on the image data of the first image included in the at least two types of images stored in the memory;
means for creating image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively; and shutter controlling means for outputting a shutter control signal for setting a light shutter to a light transmission state only in a time for displaying images in accordance with the image data of the first dispersed images.

66. A display device that sequentially displays at least two types of images, the display device comprising:

a memory that stores the image data of the inputted at least two types of images, a first image and a second image included in the at least two types of images being in a relationship of forming image data of an image not correlated with the first image when luminance values of image data respectively are added pixel by pixel;

means for creating image data of a plurality of first dispersed images based on the image data of the first image in which grayscale of pixel corresponding to the plurality of first dispersed images is luminance value of the first image when luminance values are added pixel by pixel and grayscales different from grayscale values of the first image are allocated to grayscale values respectively;

modulating means for multiplying the luminance values by a degree of modulation pixel by pixel, the degree of modulation being one or greater, in the image data of the plurality of first dispersed images; and shutter controlling means for setting a transmittance of a light shutter to a value in which a maximum transmittance is multiplied by an inverse of the degree of modulation in a time for displaying images in accordance with the modulated image data of the first dispersed images and for outputting a shutter control signal to set a light shielding state in a time for displaying images in accordance with image data of the images other than the first dispersed images.

* * * * *